United States Patent
Shin

(10) Patent No.: US 12,530,563 B2
(45) Date of Patent: Jan. 20, 2026

(54) PROVIDING ARTIFICIAL INTELLIGENCE BASED MODEL TO NODE BASED ON REPRESENTATION OF TASK PERFORMED BY ARTIFICIAL INTELLIGENCE BASED MODEL

(71) Applicant: NOTA, INC., Daejeon (KR)

(72) Inventor: Jina Shin, Seoul (KR)

(73) Assignee: NOTA, INC., Daejeon (KR)

( * ) Notice: Subject to any disclaimer, the term of this patent is extended or adjusted under 35 U.S.C. 154(b) by 0 days.

(21) Appl. No.: 18/738,895

(22) Filed: Jun. 10, 2024

(65) Prior Publication Data

US 2024/0419937 A1  Dec. 19, 2024

(30) Foreign Application Priority Data

Jun. 13, 2023  (KR) .................. 10-2023-0075269

(51) Int. Cl.
*G06N 3/04* (2023.01)

(52) U.S. Cl.
CPC ..................... *G06N 3/04* (2013.01)

(58) Field of Classification Search
CPC ....................................................... G06N 3/04
See application file for complete search history.

(56) References Cited

U.S. PATENT DOCUMENTS

| | | |
|---|---|---|
| 9,886,374 B1 | 2/2018 | Kuo et al. |
| 10,019,301 B2 | 7/2018 | Yoshida |
| 2019/0147361 A1 | 5/2019 | Matsumoto et al. |
| 2019/0340524 A1 | 11/2019 | Kirchhoff et al. |
| 2020/0104129 A1* | 4/2020 | Liu .................. G06N 20/00 |

(Continued)

FOREIGN PATENT DOCUMENTS

| | | |
|---|---|---|
| JP | 7065266 B2 | 5/2022 |
| KR | 10-2022-0078829 A | 6/2022 |

(Continued)

OTHER PUBLICATIONS

Ali, Shahzaib. Unlocking Edge AI Potential: Deploying TinyML Classification on Microcontrollers. Jun. 12, 2023. (Year: 2023).*

(Continued)

*Primary Examiner* — Michelle T Bechtold
*Assistant Examiner* — Robert Bejcek, II
(74) *Attorney, Agent, or Firm* — Seed Intellectual Property Law Group LLP

(57) ABSTRACT

According to an embodiment of the present disclosure, a method for providing an artificial intelligence-based model, performed by a computing device, is disclosed. The method includes providing a candidate model list comprising a plurality of candidate models which are artificial intelligence-based models. The method includes determining a target model to be converted or benchmarked, based on a first user input on the candidate model list. The method includes providing a candidate node list comprising a plurality of candidate nodes. The method includes determining a target node to be converted or benchmarked, based on a second user input on the candidate node list. The method includes converting the target model into a model supportable by the target node, based on information of the determined target model and information preset on the target node.

18 Claims, 7 Drawing Sheets

(56) References Cited

U.S. PATENT DOCUMENTS

| | | | |
|---|---|---|---|
| 2020/0118030 A1 | 4/2020 | Sainani et al. | |
| 2020/0342068 A1* | 10/2020 | Cai | G06F 8/77 |
| 2021/0117243 A1* | 4/2021 | Ghafourifar | G06F 9/5044 |
| 2022/0101063 A1 | 3/2022 | Chau et al. | |
| 2022/0121927 A1 | 4/2022 | O'Connor | |
| 2022/0309395 A1* | 9/2022 | Wu | G06N 20/00 |
| 2022/0335293 A1 | 10/2022 | Choi et al. | |
| 2023/0281047 A1* | 9/2023 | Mishra | G06N 3/0464 |
| | | | 712/220 |
| 2023/0368010 A1 | 11/2023 | Shim | |

FOREIGN PATENT DOCUMENTS

| | | |
|---|---|---|
| KR | 10-2022-0144281 A | 10/2022 |
| KR | 102543706 B1 | 6/2023 |

OTHER PUBLICATIONS

Mitchell et al. Model Cards for Model Reporting. FAT* '19, Jan. 29-31, 2019, Atlanta, GA, USA (Year: 2019).*
3Blue1Brown. But what is a neural network? Chapter 1, Deep learning. Youtube.com 2017. https://www.youtube.com/watch?v=aircAruvnKk (Year: 2017).*
Yusuf, Kareem. Introducing watsonx: The future of AI for business. IBM. May 9, 2023. https://www.ibm.com/new/announcements/introducing-watsonx-the-future-of-ai-for-business (Year: 2023).*
Chong et al. How Users Associate Wireless Devices. May 7-12, 2011 . Vancouver, BC, Canada (Year: 2011).*
Shi et al. Benchmarking State-of-the-Art Deep Learning Software Tools. 2016 7th International Conference on Cloud Computing and Big Data (Year: 2016).*
Minaee et al. Image Segmentation Using Deep Learning: A Survey. IEEE Transactions on Pattern Analysis and Machine Intelligence, vol. 44, No. 7, Jul. 2022 (Year: 2022).*
Amazon Web Services Korea, "Amazon Sagemaker," YouTube Video, Nov. 21, 2021, URL=https://www.youtube.com/watch?v=6sdr6dViK2U, retrieved on Mar. 21, 2024. (1 page).

* cited by examiner

PROVIDING ARTIFICIAL INTELLIGENCE BASED MODEL TO NODE BASED ON REPRESENTATION OF TASK PERFORMED BY ARTIFICIAL INTELLIGENCE BASED MODEL

CROSS-REFERENCE TO RELATED APPLICATIONS

This application claims priority to and the benefit of Korean Patent Application No. 10-2023-0075269 filed in the Korean Intellectual Property Office on Jun. 13, 2023, the entire contents of which are incorporated herein by reference.

BACKGROUND

Technical Field

The present disclosure relates to artificial intelligence technologies and more specifically techniques for providing an artificial intelligence-based model suitable to a node.

Description of the Related Art

As the development of artificial intelligence technology, a variety of types of intelligence-based models have been developed. The demand for computational resources to handle various AI-based models is also increasing, and the development of hardware with new capabilities continues within related industries.

As the demand for edge technology or edge artificial intelligence technology that can perform direct calculations on a network terminal such as personal computers, smart phones, cars, wearable devices, and robots increase, the research and developments of AI-based models that take hardware resources into account are made.

BRIEF SUMMARY

As the importance of hardware increases in the field of artificial intelligence technology along with the development of edge technology, sufficient knowledge is required not only about the model itself but also about the various hardware on which artificial intelligence-based models will be executed. For example, the inventors of the present disclosure have recognized that even if there is a model with excellent performance in a specific domain, inference performance for these models can be different for each hardware where the model is to be executed. There can also be a situation in which a model having optimal performance is not supported in specific hardware in which a service is to be provided in a specific domain. Accordingly, in order to determine the artificial intelligence-based model suitable for the service to be provided and hardware suitable for the artificial intelligence-based model together, high levels of background knowledge and vast amounts of resources for the artificial intelligence technology and hardware technology can be required. Therefore, various embodiments of the present disclosure has been made in an effort to efficiently provide an artificial intelligence-based model suitable for a specific node.

The present disclosure has been made in an effort to efficiently provide a benchmark result of a specific model in a specific node.

Technical benefits of the present disclosure are not restricted to the technical benefits mentioned as above. Other unmentioned technical benefits will be apparently appreciated by those skilled in the art by referencing the following descriptions.

According to an embodiment of the present disclosure, a method for providing an artificial intelligence-based model, performed by a computing device, is disclosed. The method can comprise providing a candidate model list comprising a plurality of candidate models which are artificial intelligence-based models, determining a target model to be converted or benchmarked, based on a first user input on the candidate model list, providing a candidate node list comprising a plurality of candidate nodes, determining a target node to be converted or benchmarked, based on a second user input on the candidate node list, and converting the target model into a model supportable by the target node, based on information of the determined target model and information preset on the target node.

According to an embodiment of the present disclosure, the candidate model list comprises information to identify an artificial intelligence task of the plurality of candidate models, and information to identify an object of the plurality of candidate models, and each of the plurality of candidate models included in the candidate model list is distinguished from other candidate models included on the candidate model list by a unit based on a combination of the artificial intelligence task and the object.

According to an embodiment of the present disclosure, the candidate model list further comprises a representative image for visually indicating an operation of each of the plurality of candidate models, and the representative image comprises a first sub-image representation for visually indicating the artificial intelligence task and a second sub-image representation for visually indicating the object.

According to an embodiment of the present disclosure, the candidate model list further comprises class information to identify each of classes used in each of the plurality of candidate models.

According to an embodiment of the present disclosure, the converting the target model comprises: determining a target framework supportable by the target node and a source framework of the target model in response to the second user input selecting the target node on the candidate node list, and automatically converting the target model to correspond to the target framework supportable by the target node without a user input when it is determined that the source framework and the target framework are different.

According to an embodiment of the present disclosure, the converting the target model comprises: determining a target framework to which the target model is converted based on the target node and indicating an output data type and software version information corresponding to the target framework, and converting the target model to correspond to the target framework supportable by the target node in response to a third user input to convert the target model.

According to an embodiment of the present disclosure, the converting the target model comprises: determining a target framework to which the target model is converted based on the target node and indicating an input size, channel information and batch size corresponding to the target framework, and converting the target model to correspond to the target framework supportable by the target node in response to a third user input to convert the target model.

According to an embodiment of the present disclosure, the converting the target model comprises: determining a source framework of the target model and a target framework supportable by the target node, determining converting identification information representing a combination the source framework and the target framework when it is determined that the source framework and the target framework are different, and converting the target model into the model supportable by the target node by determining a converter corresponding to the converting identification information among a plurality of converters and using the determined converter.

According to an embodiment of the present disclosure, the determining the target model to be converted or benchmarked based on the first user input on the candidate model list comprises providing model performance information corresponding to the target model, in response to the first user input selecting the target model on the candidate model list.

According to an embodiment of the present disclosure, the determining the target model to be converted or benchmarked based on the first user input on the candidate model list comprises providing model performance corresponding to the target model and information to identify a training dataset corresponding to the target model, in response to the first user input selecting the target model on the candidate model list.

According to an embodiment of the present disclosure, the determining the target model to be converted or benchmarked based on the first user input on the candidate model list comprises providing model performance information corresponding to the target model, information to identify a training dataset corresponding to the target model, video information to visually describe an operation of the target model, in response to the first user input selecting the target model on the candidate model list.

According to an embodiment of the present disclosure, the model performance information comprises: size information of the target model, accuracy information indicating a ratio of actual correct answers among results output by the target model as correct, and class information to identify each of classes used in the target model.

According to an embodiment of the present disclosure, the candidate node list comprises: information to identify each of the candidate nodes, and benchmark prediction information of the target model at each of the candidate nodes when the target model is executed.

According to an embodiment of the present disclosure, the benchmark prediction information is a data structure visually representing, in graph form, information for identifying each of the candidate nodes and latency information for each of the candidate nodes when the target model is executed.

According to an embodiment of the present disclosure, the benchmark prediction information is generated based on information obtained through performance measurement process for a model or a converted model at each of the candidate nodes prior to the first user input.

According to an embodiment of the present disclosure, the method further can comprise providing a benchmark result obtained by executing the converted target model at the target node. The benchmark result comprises: time information comprising preprocessing time information required for preprocessing of inference of the target model at the target node, or inference time information required for inference of the target model at the target node, and memory usage information comprising preprocessing memory usage information required for preprocessing of inference of the target model at the target node, or inference memory usage information required for inference of the target model at the target node.

According to an embodiment of the present disclosure, the method can further comprise providing a benchmark result obtained by executing the converted target model at the target node. The benchmark result comprises memory footprint information required for executing the target model on the target node, latency information required for executing the target model on the target node, and power usage information required for executing the target model on the target node.

According to an embodiment of the present disclosure, the candidate node list comprises the candidate nodes which do not support the candidate models included in the candidate model list.

According to an embodiment of the present disclosure, a computer program stored in a non-transitory computer readable medium is disclosed. The computer program allows a computing device to perform following operations to provide an artificial intelligence-based model when executed by the computing device. The operations comprise: providing a candidate model list comprising a plurality of candidate models which are artificial intelligence-based models, determining a target model to be converted or benchmarked, based on a first user input on the candidate model list, providing a candidate node list comprising a plurality of candidate nodes, determining a target node to be converted or benchmarked, based on a second user input on the candidate node list, and converting the target model into a model supportable by the target node, based on information of the determined target model and information preset on the target node.

According to an embodiment of the present disclosure, a computing device for providing an artificial intelligence-based model is disclosed. The computing device comprises at least one processor and a memory. The at least one processor can provide a candidate model list comprising a plurality of candidate models which are artificial intelligence-based models, determine a target model to be converted or benchmarked, based on a first user input on the candidate model list, provide a candidate node list comprising a plurality of candidate nodes; determine a target node to be converted or benchmarked, based on a second user input on the candidate node list; and convert the target model into a model supportable by the target node, based on information of the determined target model and information preset on the target node.

The technique according to an exemplary embodiment of the present disclosure, an artificial intelligence-based model suitable for a specific node can be efficiently provided.

The technique according to an exemplary embodiment of the present disclosure can provide a benchmark result of a specific model in a specific node by an efficient scheme.

BRIEF DESCRIPTION OF THE SEVERAL
VIEWS OF THE DRAWINGS

FIG. 1 schematically illustrates a block diagram of a computing device according to an exemplary embodiment of the present disclosure.

Figure 4:
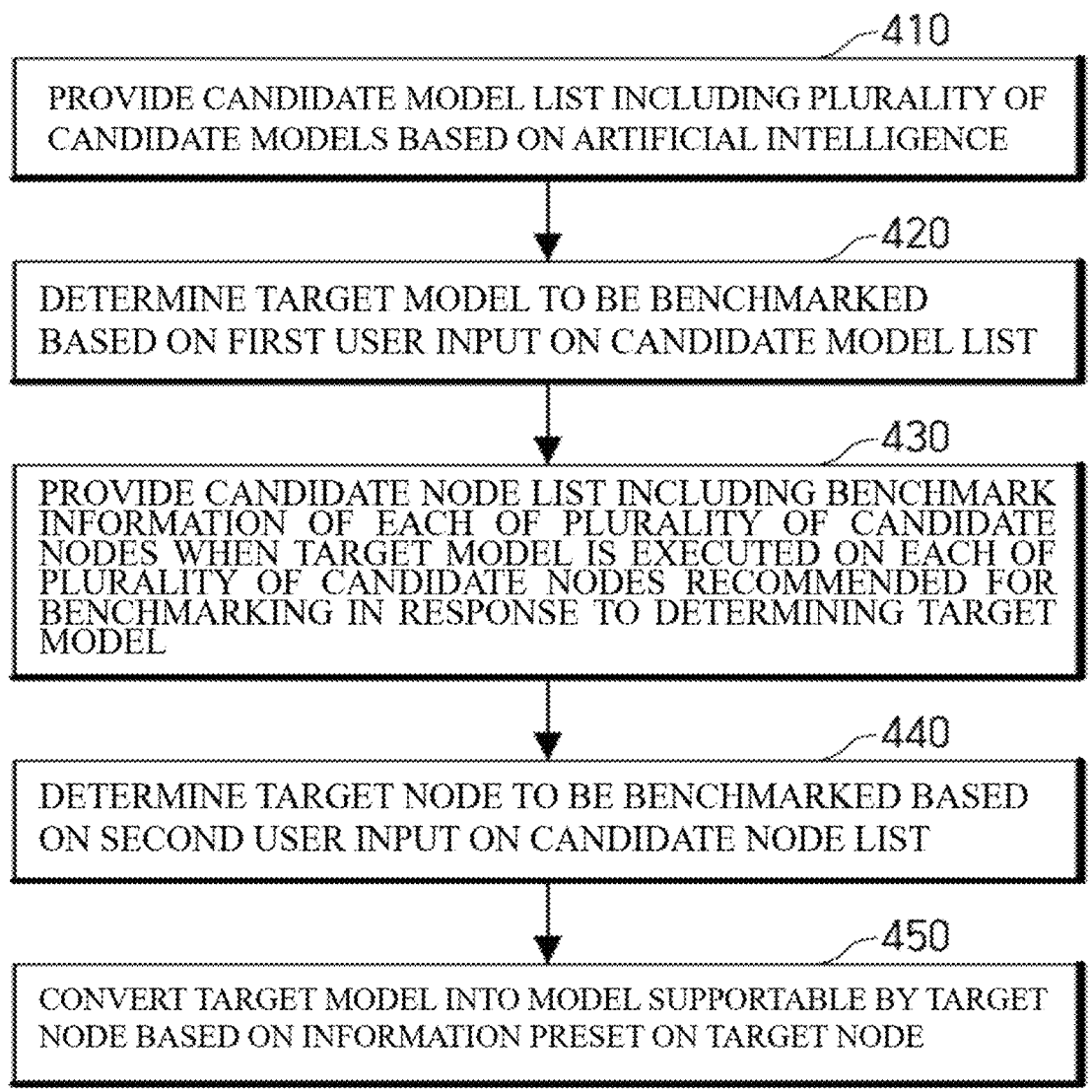

FIG. 4 exemplarily illustrates a method for providing a benchmark result according to an exemplary embodiment of the present disclosure.

Figure 5:
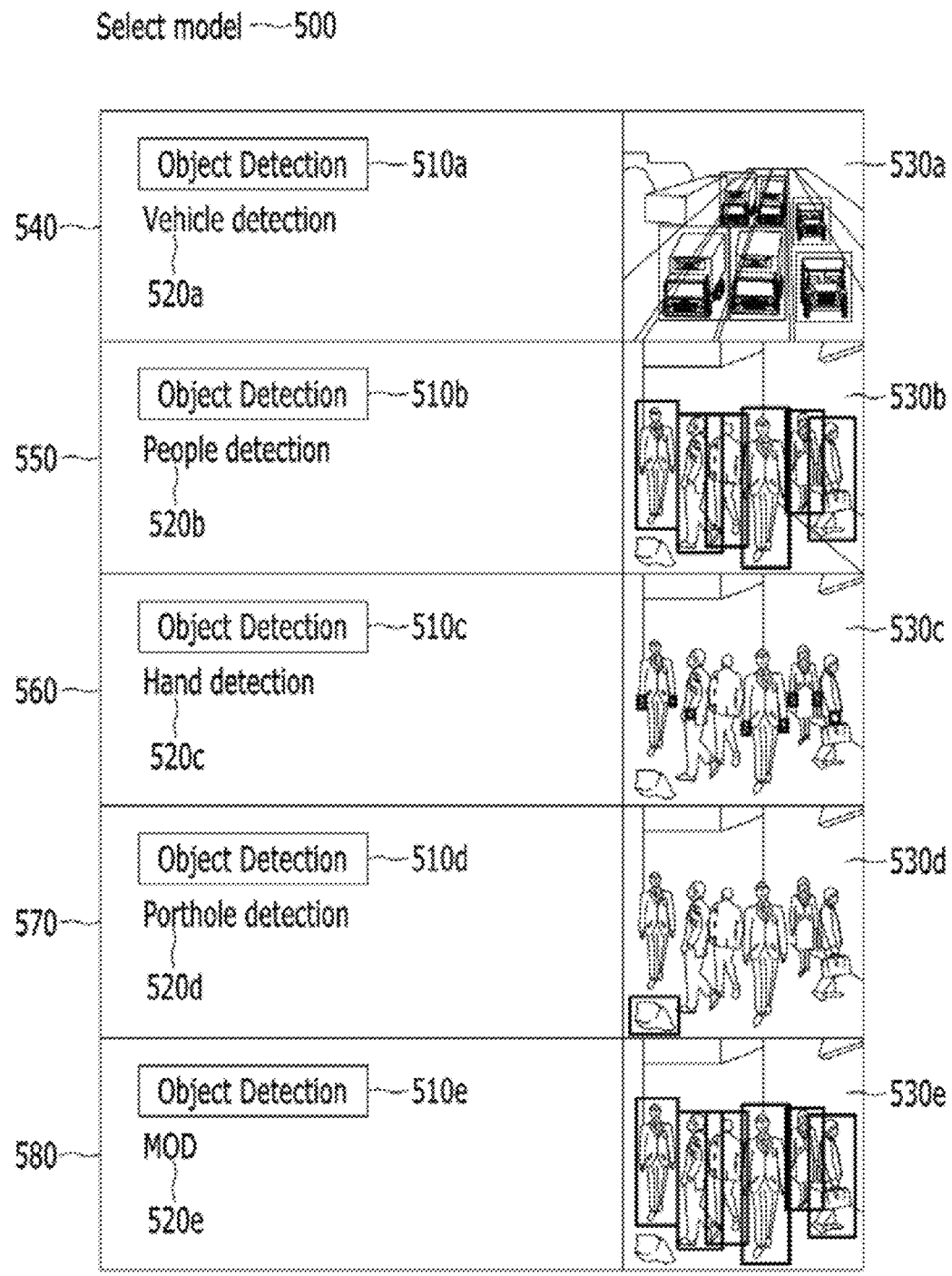

FIG. 5 exemplarily illustrates a candidate model list according to an exemplary embodiment of the present disclosure.

Figure 6:
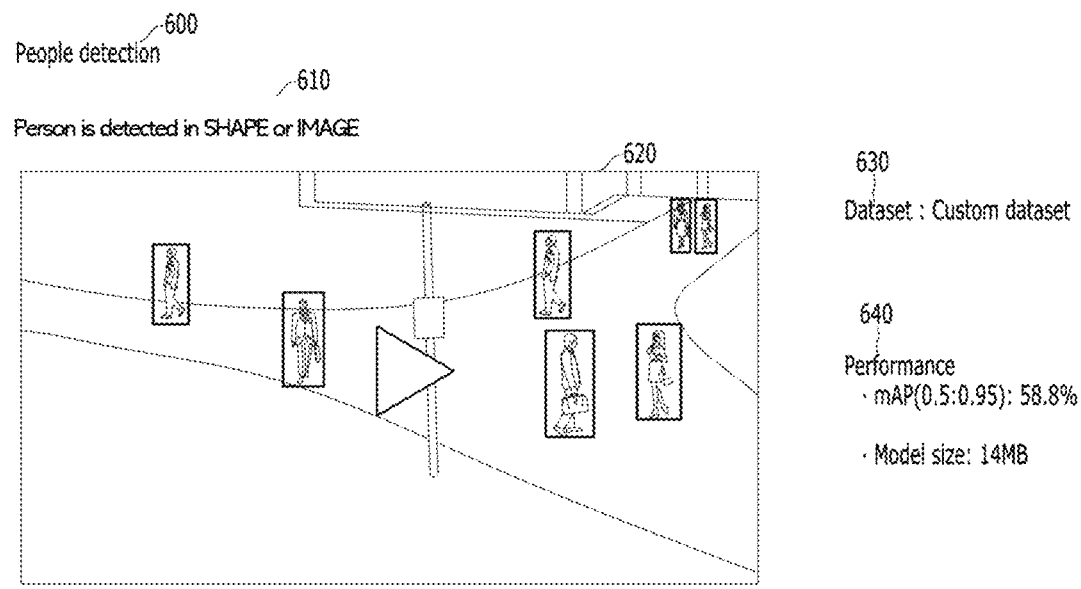

FIG. 6 exemplarily illustrates information of a target model provided according to an exemplary embodiment of the present disclosure.

Figure 7:
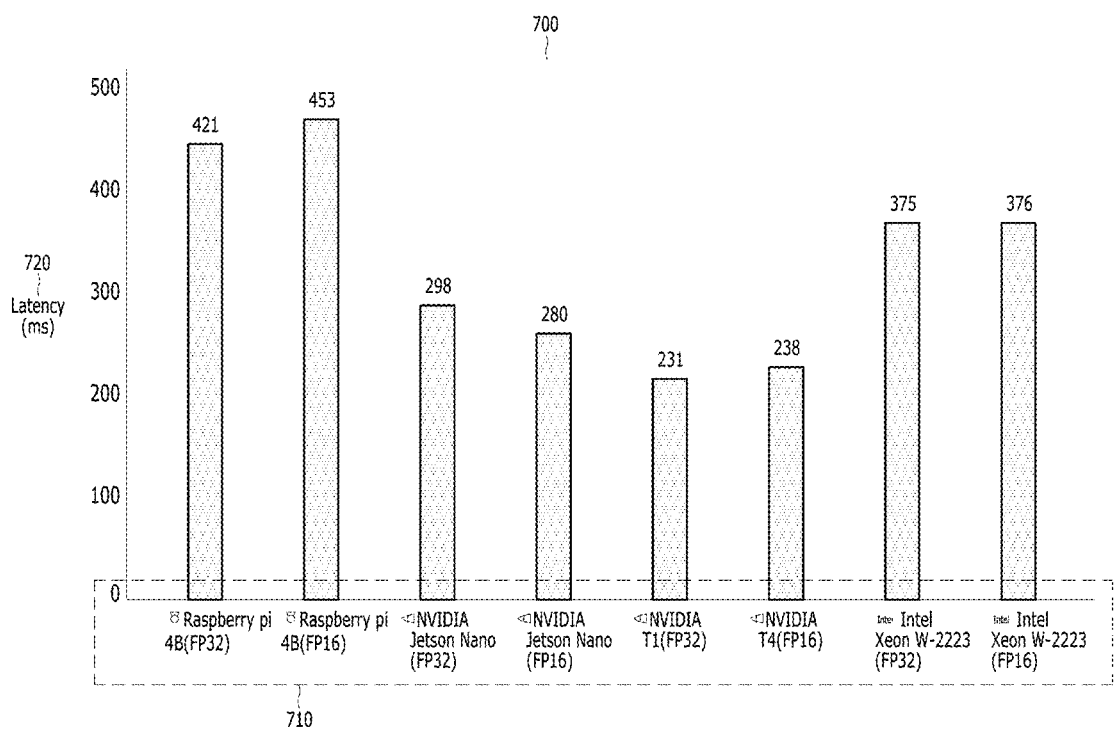

FIG. 7 exemplarily illustrates a candidate node list according to an exemplary embodiment of the present disclosure.

Figures 8, 9:
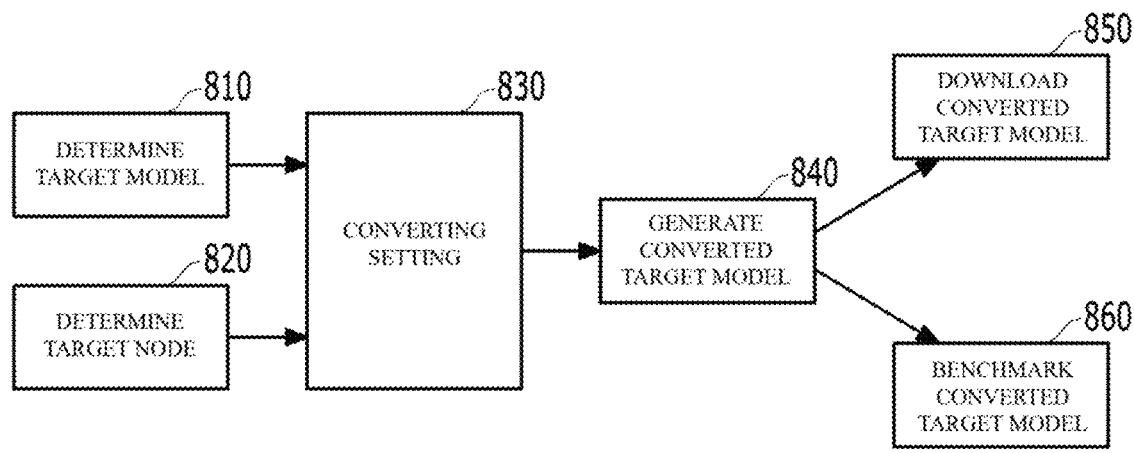

FIG. 8 exemplarily illustrates a method for providing a converted target model according to an exemplary embodiment of the present disclosure.

FIG. 9 exemplarily illustrates information of converting provided according to an exemplary embodiment of the present disclosure.

Figure 10:
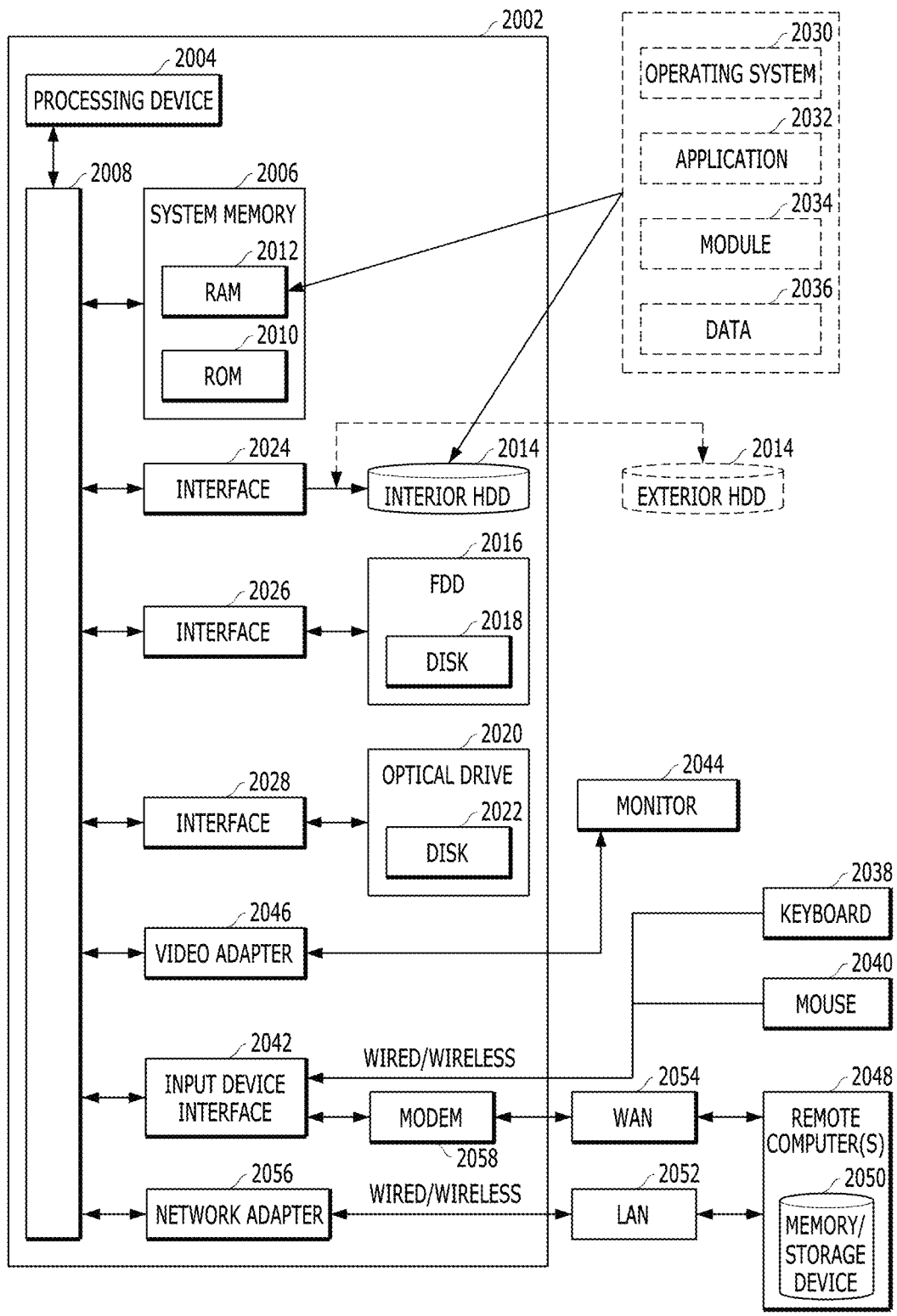

FIG. 10 is a schematic view of a computing environment of a computing device according to an embodiment of the present disclosure.

DETAILED DESCRIPTION

Various exemplary embodiments will be described with reference to drawings. In the specification, various descriptions are presented to provide appreciation of the present disclosure. Prior to describing detailed contents for carrying out the present disclosure, it should be noted that configurations not directly associated with the technical gist of the present disclosure are omitted without departing from the technical gist of the present disclosure. Further, terms or words used in this specification and claims should be interpreted as meanings and concepts which match the technical spirit of the present disclosure based on a principle in which the inventor can define appropriate concepts of the terms in order to describe his/her disclosure by a best method.

"Module," "system," and the like which are terms used in the specification refer to a computer-related entity, hardware, firmware, software, and a combination of the software and the hardware, or execution of the software, and interchangeably used. For example, the module may be a processing procedure executed on a processor, the processor, an object, an execution thread, a program, application and/or a computing device, but is not limited thereto. One or more modules may reside within the processor and/or a thread of execution. The module may be localized in one computer. One module may be distributed between two or more computers. Further, the modules may be executed by various computer-readable media having various data structures, which are stored therein. The modules may perform communication through local and/or remote processing according to a signal (for example, data from one component that interacts with other components and/or data from other systems transmitted through a network such as the Internet through a signal in a local system and a distribution system) having one or more data packets, for example.

Moreover, the term "or" is intended to mean not exclusive "or" but inclusive "or." That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" and "at least one" used in this specification designates and includes all available combinations of one or more items among enumerated related items. For example, the term "at least one of A or B" or "at least one of A and B" should be interpreted to mean "a case including only A," "a case including only B," and "a case in which A and B are combined."

Further, it should be appreciated that the term "comprise/include" and/or "comprising/including" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to recognize that various illustrative logical components, blocks, modules, circuits, means, logics, and algorithms described in connection with the exemplary embodiments disclosed herein may be additionally implemented as electronic hardware, computer software, or combinations of both sides. To clearly illustrate the interchangeability of hardware and software, various illustrative components, blocks, means, logics, modules, circuits, and steps have been described above generally in terms of their functionalities. Whether the functionalities are implemented as the hardware or software depends on a specific application and design restrictions given to an entire computing device.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

Terms expressed as N-th such as first, second, or third in the present disclosure are used to distinguish at least one entity. For example, entities expressed as first and second may be the same as or different from each other.

The term "benchmark" used in the present disclosure may mean an operation of executing or testing the model in the node or an operation of measuring the performance for the node of the model. A benchmark result or benchmark result information in the present disclosure may include information obtained according to the benchmark or information obtained by processing the information obtained according to the benchmark.

The term "artificial intelligence-based model" or "AI-based model" used in the present disclosure may be used interchangeably with a candidate model, a target, model, an artificial intelligence model, a computation model, a neural network, a network function, a neural network, and a model. The model in the present disclosure may be used as a meaning that encompasses a model file and/or model type information. In the present disclosure, the model may include any form of information for identifying the model. In an exemplary embodiment, the model type information may mean information for identifying an execution environment, a framework, or the type of the model. For example, TensorRT, TFLite and Onnx Runtime may be included in the model type information.

The term "node" used in the present disclosure may correspond to hardware information to be benchmarked for the model. The hardware information may be used as a meaning that encompasses physical hardware, virtual hardware, hardware which is impossible to be accessed through the network from the outside, hardware which is impossible to confirm externally, and/or hardware which is confirmed in a cloud. For example, the node in the present disclosure may include various types of hardware such as RaspberryPi, Coral, Jetson-Nano, AVH RasberryPi, and Mobile.

In the present disclosure, the node in the artificial intelligence-based model may be used to mean a component constituting the neural network, and for example, the node in the neural network may correspond to neuron.

Figure 1:
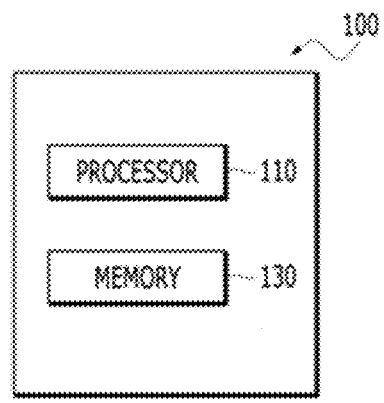

FIG. 1 schematically illustrates a block diagram of a computing device 100 according to an exemplary embodiment of the present disclosure.

According to the exemplary embodiment of the present disclosure, the computing device 100 may include a processor 110 and a memory 130.

A configuration of the computing device 100 illustrated in FIG. 1 is only an example illustrated through simplification. In an exemplary embodiment of the present disclosure, the computing device 100 may include other components for performing a computing configuration of the computing device 100 and only some of the disclosed components may constitute the computing device 100.

The computing device 100 in the present disclosure may be used interchangeably with the computing device, and the computing device 100 may be used as a meaning that encompass any type of server and any type of terminal.

In the present disclosure, the computing device 100 may mean any type of component constituting a system for implementing exemplary embodiments of the present disclosure.

The computing device 100 may mean any type of user terminal or any type of server. The components of the computing device 100 may be exemplary and some components may be excluded, or an additional component may be included in the computing device 100. As an example, when the computing device 100 includes a user terminal, an output unit (not illustrated) and an input unit (not illustrated) may be included in a scope of the computing device 100.

In an exemplary embodiment, the computing device 100 may mean a device that manages and/or performs the benchmark for a plurality of nodes of a specified artificial intelligence-based model in communication with a plurality of nodes. For example, the computing device 100 may be referred to as device farm.

In an exemplary embodiment, the computing device 100 may determine a target model to be benchmarked based on a candidate model list including a plurality of artificial intelligence-based candidate models, and determine a target node to be benchmarked based on a candidate node list including a plurality of candidate nodes. In such an example, the computing device 100 may provide a benchmark result obtained by executing the target model at the target node.

In an exemplary embodiment, the computing device 100 may perform an operation of converting the target model into a model that is supportable by the target node. The computing device 100 may provide the converted target model in a downloadable form. The computing device 100 may provide a benchmark result obtained by executing the converted target model at the target node.

In an exemplary embodiment, the computing device 100 may mean a device that generates a learning model by interacting with the user, generates a compressed model, and generates download data for deploying the model.

In an exemplary embodiment, the computing device 100 may mean a device that manages and/or performs a benchmark for the plurality of nodes of the artificial intelligence-based model, generates a learning model by interacting with the user, generates a compressed model, and generates download data for deploying the model.

In an exemplary embodiment, the computing device 100 may also mean a device that generates the learning model through modeling for an input dataset, generates a lightweight model through compression for an input model, and/or generates download data so as to deploy the input model in a specific node. In the present disclosure, deploy or deployment may mean any type of activity which enables using software (e.g., model). For example, the deploy or deployment may be interpreted as an overall process customized according to specific requirements or characteristics of the model or node. An example for the deploy or deployment may include release, installation and activation, deactivation, removal, update, built-in update, adaptation, and/or version tracking.

The computing device 100 in the present disclosure may provide a candidate model list including a plurality of artificial intelligence-based candidate models, determine a target model to be benchmarked based on a first user input in the candidate model list, provide candidate node list including benchmark information in each of a plurality of candidate nodes when the target model is executed in each of the plurality of candidate nodes recommended for the benchmark, in response to determining the target model, determine the target node to be benchmarked based on a second user input in the candidate node list, and provide a benchmark result obtained as the target model is executed at the target node.

In an exemplary embodiment, the computing device 100 may convert the target model into a form supportable by the target node when the target model and the target node are determined.

In an exemplary embodiment, the computing device 100 may determine whether to convert an artificial intelligence-based model based on model type information of the artificial intelligence-based model, which is input for the benchmark and target type information identifying a model type to be benchmarked, and provide a candidate node list including candidate nodes determined based on the target type information, and determine, based on input data for selecting at least one target node in the candidate node list, the at least one target node, and provide a benchmark result obtained as a target model obtained according to whether to convert the artificial intelligence-based model is executed in the at least one target node.

In an exemplary embodiment, the computing device 100 may obtain input data including an inference task and a dataset, determine a target model to be benchmarked for the inference task and at least one target node in which the inference task of the target model is to be executed, and provide a benchmark result obtained as the target model is executed in at least one target node.

In an exemplary embodiment, the computing device 100 may receive, from another computing device including a plurality of modules that performs different operations related to the artificial intelligence-based model, module identification information indicating which module among the plurality of modules of another computing device is to trigger a benchmark operation of the computing device 100, and provide the benchmark result to another computing device based on the module identification information. Here, the benchmark result provided to another computing device may vary depending on the module identification information.

In another exemplary embodiment of the present disclosure, the computing device 100 may also obtain the benchmark result from another computing device or an external entity. In another exemplary embodiment of the present disclosure, the computing device 100 may also obtain a result of performing converting from another computing device or an external entity (e.g., a converting device).

In an exemplary embodiment, the processor 110 may be constituted by at least one core and may include processors for data analysis and/or processing, which include a central processing unit (CPU), a general-purpose graphics processing unit (GPGPU), a tensor processing unit (TPU), and the like of the computing device 100.

The processor 110 may read a computer program stored in the memory 130 to provide the benchmark result according to an exemplary embodiment of the present disclosure.

According to an exemplary embodiment of the present disclosure, the processor 110 may also perform a computation for learning a neural network. The processor 110 may perform calculations for learning the neural network, which include processing of input data for learning in deep learning (DL), extracting a feature in the input data, calculating an error, updating a weight of the neural network using back-propagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of the plurality of computing devices may be used together to process the learning of the network function and the data classification using the network function. Further, the computer program executed in the computing device 100 according to an exemplary embodiment of the present disclosure may be a CPU, GPGPU, or TPU executable program.

Additionally, the processor 110 may generally process an overall operation of the computing device 100. For example, the processor 110 processes data, information, signals, and the like input or output through the components included in the computing device 100 or drives the application program stored in a storage unit to provide information or a function appropriate for the user.

According to an exemplary embodiment of the present disclosure, the memory 130 may store any type of information generated or determined by the processor 110 or any type of information received by the computing device 100. According to an exemplary embodiment of the present disclosure, the memory 130 may be a storage medium that stores computer software which allows the processor 110 to perform the operations according to the exemplary embodiments of the present disclosure. Therefore, the memory 130 may mean computer-readable media for storing software codes required for performing the exemplary embodiments of the present disclosure, data which become execution targets of the codes, and execution results of the codes.

According to an embodiment of the present disclosure, the memory 130 may mean any type of storage medium, and include, for example, at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the memory 130 used in the present disclosure is not limited to the examples.

In the present disclosure, the communication unit (not illustrated) may be configured regardless of communication modes such as wired and wireless modes and constituted by various communication networks including a personal area network (PAN), a wide area network (WAN), and the like. Further, the network unit 150 may operate based on known World Wide Web (WWW) and may adopt a wireless transmission technology used for short-distance communication, such as infrared data association (IrDA) or Bluetooth.

The computing device 100 in the present disclosure may include any type of user terminal and/or any type of server. Therefore, the exemplary embodiments of the present disclosure may be performed by the server and/or the user terminal.

In an exemplary embodiment, the user terminal may include any type of terminal which is capable of interacting with the server or another computing device. The user terminal may include, for example, a mobile phone, a smart phone, a laptop computer, personal digital assistants (PDA), a slate PC, a tablet PC, and an Ultrabook.

In an exemplary embodiment, the server may include, for example, any type of computing system or computing device such as a microprocessor, a mainframe computer, a digital processor, a portable device, and a device controller.

In an exemplary embodiment, the server may store and manage a benchmark result, benchmark information, a candidate model list, a candidate node list, performance information of models, performance information of nodes, latency information between the node and the model, and/or converting result information. The server may include a storage unit (not illustrated) for storing the information. The storage unit may be included in the server, or may be present under the management of the server. As another example, the storage unit may also be present outside the server, and implemented in a form which is capable of communicating with the server. In this case, the storage unit may be managed and controlled by another external server different from the server. As another example, the storage unit may also be present outside the server, and implemented in a form which is capable of communicating with the server. In this case, the storage unit may be managed and controlled by another external server different from the server.

Figure 2:
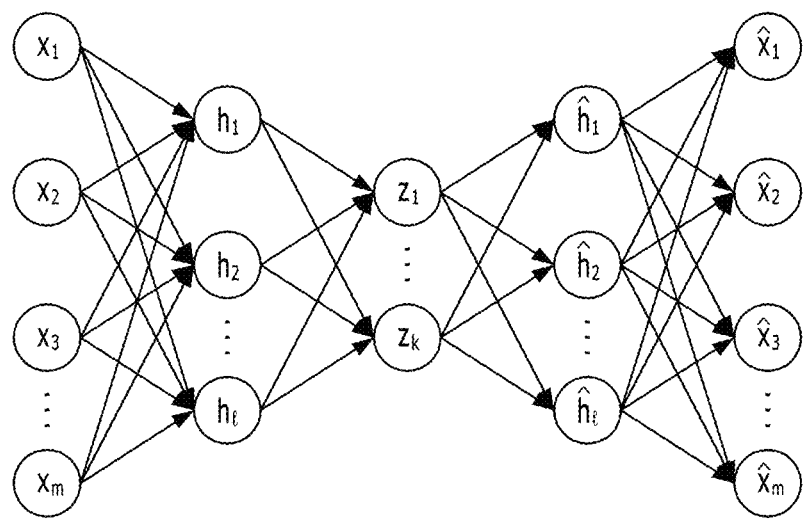
FIG. 2 illustrates an exemplary structure of an artificial intelligence-based model according to an exemplary embodiment of the present disclosure.

FIG. 2 illustrates an illustrative structure of an artificial intelligence-based model according to an exemplary embodiment of the present disclosure.

Throughout the present disclosure, the model, the artificial intelligence model, the artificial intelligence-based model, the operation model, and the neural network, the network function, and the neural network may be used interchangeably.

The artificial intelligence-based model in the present disclosure may include models which are utilizable in various domains, such as a model for image processing such as object segmentation, object detection, and/or object classification, a model for text processing such as data prediction, text semantic inference and/or data classification, etc.

The neural network may be generally constituted by an aggregate of calculation units which are mutually connected to each other, which may be called "node." The nodes may also be called neurons. The neural network is configured to include one or more nodes. The nodes (or neurons) constituting the neural networks may be mutually connected to each other by one or more links.

The node in the artificial intelligence-based model may be used to mean a component that constitutes the neural network, and for example, the node in the neural network may correspond to the neuron.

In the neural network, one or more nodes connected through the link may relatively form a relationship between an input node and an output node. Concepts of the input node and the output node are relative and a predetermined node which has the relationship of the output node with respect to one node may have the relationship of the input node in the relationship with another node and vice versa. As described above, the relationship of the output node to the input node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable, and the weight may be varied by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links. For example, when the same number of nodes and links exist and two neural networks in which the weight values of the links are different from each other exist, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed from the initial input node up to the corresponding node. However, definition of the layer is predetermined for description and the order of the layer in the neural network may be defined by a method different from the aforementioned method. For example, the layers of the nodes may be defined by the distance from a final output node.

In an exemplary embodiment of the present disclosure, the set of the neurons or the nodes may be defined as the expression "layer."

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

The deep neural network (DNN) may mean a neural network including a plurality of hidden layers other than the input layer and the output layer. When the deep neural network is used, the latent structures of data may be identified. That is, photographs, text, video, voice, protein sequence structure, genetic sequence structure, peptide sequence structure, and/or potential structure of music (e.g., what objects are in the photo, what is the content and emotions of the text, what contents and emotions of the voice, etc.) may be identified. The deep neural network may include convolutional neural network (CNN), recurrent neural network (RNN), auto encoder, generative adversarial networks (GAN), restricted Boltzmann machine (RBM), deep belief network (DBN), Q network, U network, Siamese network, etc. The description of the deep neural network described above is just an example and the present disclosure is not limited thereto.

The artificial intelligence-based model of the present disclosure may be expressed by a network structure of an arbitrary structure described above, including the input layer, the hidden layer, and the output layer.

The neural network which may be used in a clustering model in the present disclosure may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (e.g., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (e.g., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (e.g., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, a computer readable medium is disclosed, which stores a data structure including the benchmark result and/or the artificial intelligence based model. The data structure may be stored in a storage unit (not illustrated) in the present disclosure, and executed by the processor 110 and transmitted and received by a communication unit (not illustrated).

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user defines. The physical relationship between data elements may include an actual relationship between data elements physically stored on a computer-readable storage medium (e.g., persistent storage device). The data structure may specifically include a set of data, a relationship between the data, a function which may be applied to the data, or instructions. Through an effectively designed data structure, a computing device may perform operations while using the resources of the computing device to a minimum. Specifically, the computing device may increase the efficiency of operation, read, insert, delete, compare, exchange, and search through the effectively designed data structure.

The data structure may be divided into a linear data structure and a non-linear data structure according to the type of data structure. The linear data structure may be a structure in which only one data is connected after one data. The linear data structure may include a list, a stack, a queue, and a deque. The list may mean a series of data sets in which an order exists internally. The list may include a linked list. The linked list may be a data structure in which data is connected in a scheme in which each data is linked in a row with a pointer. In the linked list, the pointer may include link information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO—Last in First Out) in which the data is input last and output first. The queue is a data listing structure that may access data limitedly and unlike a stack, the queue may be a data structure (FIFO—First in First Out) in which late stored data is output late. The deque may be a data structure capable of processing data at both ends of the data structure.

The non-linear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

The data structure may include the neural network. In addition, the data structures, including the neural network, may be stored in a computer readable medium. The data structure including the neural network may also include data preprocessed for processing by the neural network, data input to the neural network, weights of the neural network, hyper parameters of the neural network, data obtained from the neural network, an active function associated with each node or layer of the neural network, and a loss function for learning the neural network. The data structure including the neural network may include predetermined components of the components disclosed above. In other words, the data structure including the neural network may include all of data preprocessed for processing by the neural network, data input to the neural network, weights of the neural network, hyper parameters of the neural network, data obtained from the neural network, an active function associated with each node or layer of the neural network, and a loss function for learning the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called "node." The nodes may also be called neurons. The neural network is configured to include one or more nodes.

The data structure may include data input into the neural network. The data structure including the data input into the neural network may be stored in the computer readable medium. The data input to the neural network may include learning data input in a neural network learning process and/or input data input to a neural network in which learning is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include the weight of the neural network (in the present disclosure, the weight and the parameter may be used as the same meaning). In addition, the data structures, including the weight of the neural network, may be stored in the computer readable medium. The neural network may include a plurality of weights. The weight may be variable and the weight may be varied by a user or an algorithm in order for the neural network to perform a desired function. For example, when one or more input nodes are mutually connected to one output node by the respective links, the output node may determine a data value output from an output node based on values input in the input nodes connected with the output node and the weights set in the links corresponding to the respective input nodes. The data structure is just an example and the present disclosure is not limited thereto.

As a non-limiting example, the weight may include a weight which varies in the neural network learning process and/or a weight in which neural network learning is completed. The weight which varies in the neural network learning process may include a weight at a time when a learning cycle starts and/or a weight that varies during the learning cycle. The weight in which the neural network learning is completed may include a weight in which the learning cycle is completed. Accordingly, the data structure including the weight of the neural network may include a data structure including the weight which varies in the neural network learning process and/or the weight in which neural network learning is completed. Accordingly, the above-described weight and/or a combination of each weight are included in a data structure including a weight of a neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconfigured in the same computing device or another computing device through deserialization. The data structure including the weight of the neural network is not limited to the serialization. Furthermore, the data structure including the weight of the neural network may include a data structure (for example, B-Tree, R-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example, and the present disclosure is not limited thereto.

Figure 3:
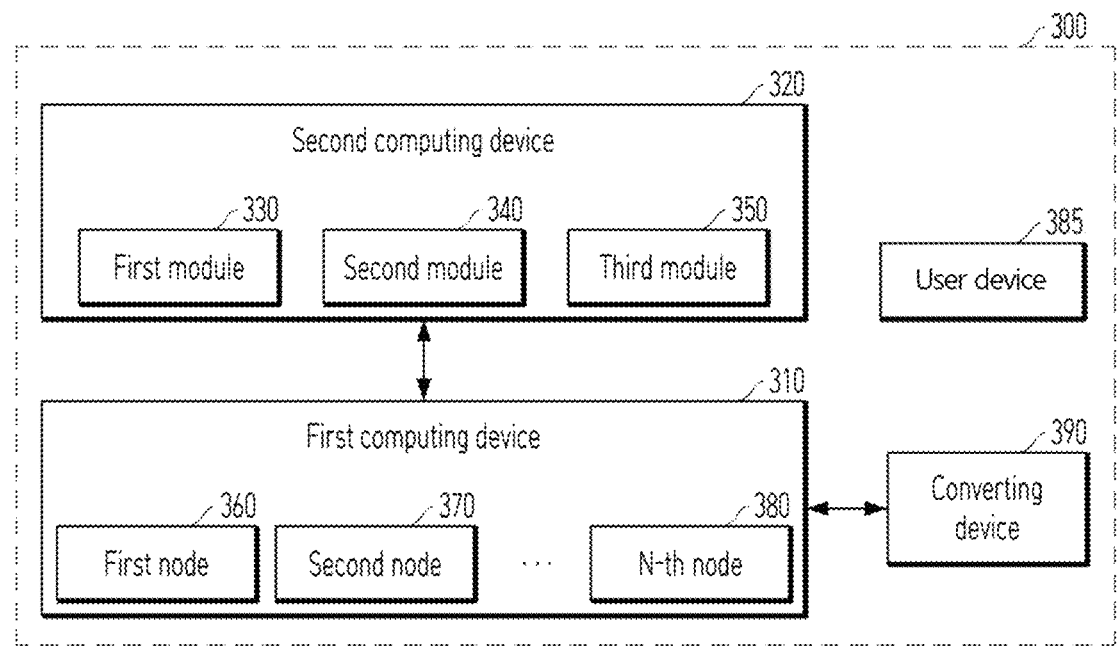
FIG. 3 is an exemplary schematic view for a system for providing a benchmark result according to an exemplary embodiment of the present disclosure.

FIG. 3 is an exemplary schematic view for a system 300 for providing a benchmark result according to an exemplary embodiment of the present disclosure.

In an exemplary embodiment, the system 300 may correspond to the computing device 100. In another exemplary embodiment, at least one of a first computing device 310, a second computing device 320, or a user device 385 may also correspond to the computing device 100.

In FIG. 3, the first computing device 310, the second computing device 320, the user device 385, and the converting device 390 are expressed as separate entities, but it will be apparent to those skilled in the art that according to the implementation aspect, two or more devices of the devices 310, 320, 385, and 390 may be implemented in an integrated form.

In an exemplary embodiment, the first computing device 310 may include or manage a first node 360, a second node 370, . . . , an N-th node 380. As an example, at least some of the first node 360, the second node 370, . . . , and the N-th node 380 may be included in the candidate node list, and the target node to be benchmarked may be determined based on the user input on the candidate node list. As an example, the first computing device 310 may serve as the device farm that performs the benchmark for each of the plurality of nodes.

In an exemplary embodiment, the second computing device 320 may include a plurality of modules that performs different operations related to the artificial intelligence-based model. For example, the second computing device 320 may include a first module 330, a second module 340, and a third module 350. In an exemplary embodiment, the first module 330 may generate a learning model based on an input dataset. The second module 340 compresses the input model to generate a lightweight model. The third module 350 may generate download data for deploying the input model in at least one target node. In the example of FIG. 3, three modules are taken as an example, but it will be appreciated by those skilled in the art that various numbers of modules may be included in the second computing device 320 according to an implementation aspect.

In an exemplary embodiment, a plurality of modules 330, 340, and 350 may generate outputs of respective modules by utilizing a benchmark result by different schemes.

For example, the first module 330 may generate a learning model (or block) based on the input dataset. The first module 330 may use the benchmark result for determining a target device which is to benchmark the learning model (or block). The first module 330 may use the benchmark result in order to confirm a performance when the learning model (or block) is executed at the target device. The first module 330 may use the benchmark result for generating a learning model or re-learning model. The first module 330 may use the benchmark result for determining the type of learning model or re-learning model corresponding to the dataset. The benchmark result may be used to evaluate the performance of the learning model (or block) output from the first module 330. The performance of the learning model output from the first module 330 may include a memory footprint, a latency, power consumption, and/or node information (an execution environment of the node, a processor, and/or a RAM size).

For example, the second module 340 compresses the input model to generate a lightweight model. The second module 340 may use the benchmark result for determining compression setting data for the input model.

For example, the third module 350 may generate download data for deploying the input model in at least one target node. The third module 350 may use the benchmark result for generating the download data or converting data into a data type supported by the target node. Additionally, the third module 350 may use the benchmark result for checking which degree of performance the input model shows in a node which has a specification which is similar to a specification of a node desired by the user as much as possible.

In an exemplary embodiment, the first computing device 310 and the second computing device 320 interacts with each other to provide the benchmark result or the benchmark prediction result to the user device 385. For example, the first computing device 310 may provide a benchmark result or a benchmark prediction result required for the operation of the second computing device 320 to the second computing device 320 in response to a request of the second computing device 320.

In an exemplary embodiment, in FIG. 3, the first computing device 310 is expressed as a separate entity outside the second computing device 320, but the first computing device 310 and the second computing device 320 may also operate as an integrated form of system or module according to an implementation aspect.

In an exemplary embodiment, the first computing device 310 may receive the query related to the benchmark from the second computing device 320 or the user device 385. The first computing device 310 may also receive the query related to the benchmark from entities other than the second computing device 320.

In an exemplary embodiment, the query related to the benchmark may include a request to benchmark. The first computing device 310 may provide a user interface which may interact with the user in response to the query related to the benchmark. For example, the first computing device 310 may provide the candidate model list through the user interface and determine a target model to be benchmarked in response to a user input on the candidate model list. In response to determining the target model, the first computing device 310 provides a candidate node list including benchmark information of each of a plurality of candidate nodes through the user interface, and determine the target node to be benchmarked in response to the user input on the candidate node list.

In an exemplary embodiment, the query related to the benchmark may also include information of the target model to be benchmarked and a target node in which the benchmark is to be executed.

In an exemplary embodiment, the query related to the benchmark may include information of a specific area (e.g., a part of the model) in the model to be benchmarked and information of the node in which the benchmark is to be executed. The technique according to an exemplary embodiment of the present disclosure allows the user to set a benchmark target not only in model units, but also in layer or operator units constituting the model or a unit corresponding to a group thereof. Accordingly, the technical effect of being able to address more accurate and specific user needs may be achieved.

In an exemplary embodiment, the first computing device 310 may provide a candidate node list including benchmark information of each of the plurality of candidate nodes when the target model is executed on each of the plurality of candidate nodes recommended for benchmarking. In an exemplary embodiment, the benchmark information may mean information obtained based on a result of executing a specific model on a specific node. As an example, the benchmark information may include a past benchmark result. As an example, the benchmark information may include information determined based on past actually measured information. As an additional example, the benchmark information may also correspond to benchmark anticipation information or benchmark prediction information determined based on past actually measurement information. For example, the benchmark information may include latency information.

In an exemplary embodiment, the benchmark result may include a result of executing a specific model in a specific node. For example, the benchmark result may contain more information than the benchmark information. For example, the benchmark result may include latency information, power consumption information, and/or memory usage information.

In an exemplary embodiment, the benchmark result and/or benchmark information may include performance information for the specific model in the specific node.

In an exemplary embodiment, the first computing device 310 may generate benchmark information or benchmark results corresponding to various types of benchmark queries. For example, the benchmark information or the benchmark result may include different information according to the type of benchmark query and/or information included in the benchmark query.

In an exemplary embodiment, the first computing device 310 may receive module identification information indicating which module among the plurality of modules of the second computing device 320 triggers the benchmark operation of the first computing device 310, and provides the benchmark result or the benchmark information to the second computing device 320 based on the module identification information. The benchmark result or the benchmark information provided to the second computing device 320 may vary depending on the module identification information. For example, the first computing device 310 may provide performance information for the entire model to the second computing device 320 when the module identification information indicates the first module 330, and provide the performance information for the entire model to the second computing device 320 and/or provide performance information by the unit of a partial area of the model when the module identification information indicates the second module 340.

In an additional exemplary embodiment, the first computing device 310 may also provide, to the second computing device 320, a benchmark result for determining a target node in which the learning model corresponding to the input dataset or the converted learning model is to be executed when the module identification information indicates the first module 330. The first computing device 310 may provide, to the second computing device 320, a benchmark result or benchmark information including compression setting data used for generating the lightweight model corresponding to the model when the module identification information indicates the second module 340.

In an exemplary embodiment, the first computing device 310 may correspond to an entity that manages a plurality of nodes. The first computing device 310 may perform a benchmark for nodes included in a node list including a first node 360, a second node 370, . . . , an N-th node 380. Here, N may correspond to a natural number. For example, the first node 360 to the N-th node 380 may be included in a candidate node list which is under the management of the first computing device 310.

In FIG. 3, it is exemplified that the first node 360, the second node 370, . . . , the N-th node 380 are included in the first computing device 310, but the first node 360, the second node 370, . . . , the N-th node 380 are present outside the first computing device 310 according to an implementation aspect, and may interact with each other through communication with the first computing device 310.

In an exemplary embodiment, the first computing device 310 may generate a benchmark result or benchmark information for at least one node among the plurality of nodes in response to the benchmark query from the user device 385 and/or the benchmark query from the second computing device 320. For example, the benchmark query from the user device 385 may be input into the second computing device 320, and the benchmark query may also be transmitted to the first computing device 310 through the second computing device 320.

In an exemplary embodiment, the first computing device 310 may generate a benchmark result or benchmark information for at least one node among the plurality of nodes by interacting with the converting device 390 in response to the benchmark query from the user device 385 and/or the benchmark query from the second computing device 320. In an exemplary embodiment, the converting device 390 may correspond to an entity for converting the model. For example, the converting device 390 may convert the model determined by the user or the model included in the benchmark query into a model which is executable at the target node. For example, when the conversion for the model is included in the benchmark query, the converting device 390 may perform model conversion according to the benchmark query.

In an exemplary embodiment, models included in the candidate model list may include models corresponding to type A. The candidate node list may include nodes that support models (e.g., type B, type C, etc.) of types other than type A. In such an exemplary embodiment, in order for the target model (e.g., type A model) determined by the user to be executed at the target node among the candidate nodes, conversion of the operator and/or framework of the target model is required. Accordingly, the converting device 390 may convert the target model into a type in which the target model may be supported by the target node.

As illustrated in FIG. 3, the converting device 390 may be present as a separate entity from the first computing device 310 and the second computing device 320. As another example, the converting device 390 may also operate as an entity included in the first computing device 310 and/or the second computing device 320.

In an exemplary embodiment, the benchmark result or benchmark information may include a result of executing (e.g., inferring) the artificial intelligence-based model at the target node. As an example, the benchmark result or benchmark information may include a performance measurement result which may be obtained from the target node when the artificial intelligence-based model (e.g., the target model) is executed at the target node. As another example, the benchmark result or benchmark information may include a performance measurement result when the converted artificial intelligence-based model is executed at the target node.

In an additional exemplary embodiment, the benchmark prediction result may include a result anticipated when executing (e.g., inferring) the artificial intelligence-based model at the target node. As an example, the benchmark prediction result may include an anticipated performance measurement result which may be obtained from the target node when the artificial intelligence-based model is executed at the target node. As another example, the benchmark prediction result may include an anticipated performance measurement result when the converted artificial intelligence-based model is executed at the target node. The benchmark prediction result may be generated based on a pre-obtained benchmark result. For example, the benchmark result may be used for generating the benchmark prediction result.

In an exemplary embodiment, the benchmark result and/or the benchmark information may be used for various purposes, and as various forms. For example, the benchmark result and/or the benchmark information may be used for determining the target node in which the model is to be executed. For example, the benchmark result and/or the benchmark information may be used for generating the candidate node list corresponding to the input model. For example, the benchmark result and/or the benchmark information may be used for optimization or compression for the model. For example, the benchmark result and/or the benchmark information may be used for deploying the target model at the target node.

FIG. 4 exemplarily illustrates a flowchart for providing a benchmark result according to an exemplary embodiment of the present disclosure.

In an exemplary embodiment, the method illustrated in FIG. 4 may be performed by the computing device 100. As an example, the method illustrated in FIG. 4 may be performed by the first computing device 310. As another example, the method illustrated in FIG. 4 may be performed by the computing device 100 that encompasses the first computing device 310 and the second computing device 320.

Hereinbelow, an example in which steps of FIG. 4 are performed by the computing device 100 will be described in detail. It will be appreciated by those skilled in the art that some of the steps illustrated in FIG. 4 may be omitted or an additional step may be included according to the implementation aspect.

In an exemplary embodiment, the computing device 100 may provide a candidate model list including a plurality of candidate models based on artificial intelligence (410).

In an exemplary embodiment, the candidate model list may include identification information for each of the plurality of candidate models. The identification information may include any form of information for identifying a specific model. For example, the identification information may include a name of the model, a task of the model, and/or an object of the model.

In an exemplary embodiment, the candidate model list may also include a representative image to visually display an operation of each candidate model. In an exemplary embodiment, any form of images which may represent the task and the object of the model may be displayed at locations associated with the identification information of the model. For example, when the candidate model is a model that performs object detection for a vehicle, "an example image in which a bounding box is represented around the vehicle" may be output at a location corresponding to the candidate model on the candidate model list.

In an exemplary embodiment, the candidate model list may include information for identifying artificial intelligence tasks of the plurality of candidate models. In an exemplary embodiment, the candidate model list may include information for identifying objects of the plurality of candidate models. In an exemplary embodiment, the candidate model list may include task information and/or object information. In an exemplary embodiment, each of the candidate models included in the candidate model list may be specified and classified as a task-object.

In an exemplary embodiment, the task in the present disclosure may correspond to an operation scheme of the artificial intelligence-based model. The task in the present disclosure may correspond to a purpose of the artificial intelligence-based model. For example, the task may include object detection, semantic segmentation, instance segmentation, clustering, and/or classification.

In an exemplary embodiment, the object in the present disclosure may correspond to a target or a domain to which the artificial intelligence-based model is applied. For example, the object may include faces, persons, animals, vehicles, and/or hands.

In an exemplary embodiment, each of the plurality of candidate models in the candidate model list may be classified based on the task and the object. For example, the task and the object may be assigned to each of the candidate models.

A technique according to an exemplary embodiment of the present disclosure displays the task and object of the model through the candidate model list, thereby allowing a user who lacks knowledge or information of models to efficiently select a necessary model.

In an additional exemplary embodiment, the candidate model list may provide class information corresponding to each of the models jointly with the models. The class information is information for identifying a class used in the model. For example, the class information may include information for identifying each of the classes to be used for a classification result in a classification model. For example, the class information may include information for identifying each of classes to be used for a detection result in a detection model. For example, when the target model is an object detection model, the class information may include a person class, an animal class, and/or a vehicle class.

In an exemplary embodiment, the computing device 100 may determine a target model to be benchmarked based on a first user input on the candidate model list (420).

In an exemplary embodiment, the first user input may include selecting the target model to be benchmarked from the candidate model list. For example, when a user input is made at a location corresponding to a specific model on a candidate model list in which a plurality of candidate models is listed, the computing device 100 may display detailed information corresponding to the selected model. For example, the computing device 100 may provide model performance information corresponding to the target model in response to the first user input. An example of the model performance information may include accuracy information for the model. As a non-limited example, the accuracy information may include information indicating a ratio actually corresponding to a correct answer among results output as the correct answer by the model. As an example, the accuracy information may include mean average precision (mAP). As an additional example, the model performance information may include values resulting from a difference between actual and predicted values, a ratio of data that is the correct answer among all output data, an error matrix representing the classification categories of the predicted category and actual data, a precision indicating a ratio of actual positives among those judged to be positive, recall, and/or sensitivity.

In an exemplary embodiment, the computing device 100 may provide information for identifying a training dataset corresponding to the target model and model performance information corresponding to the target model, in response to the first user input for selecting the target model on the candidate model list. For example, the information for identifying the training dataset may include any form of information to identify a training dataset uploaded by the user. For example, the information for identifying the training dataset may include information for identifying data (e.g., data prepared by computing device 100) used to train the target model. For example, the information for identifying the training dataset may include name information, extension information, and/or file size information of the training dataset.

In an exemplary embodiment, the computing device 100 may provide class information corresponding to the target model in response to the first user input for selecting the target model. The class information is information for identifying the class used in the model. For example, the class information may include information for identifying each of the classes to be used for the classification result in the classification model. For example, the class information may include information for identifying each of the classes to be used for the detection result in the detection model. For example, when the target model is an object detection model, the class information may include a person class, an animal class, and/or a vehicle class. In an exemplary embodiment, the class information may be displayed along with the information for identifying the training dataset corresponding to the target model and/or the information for visually identifying the operation of the target model, allowing the user to intuitively recognize accurate information of the target model.

In an exemplary embodiment, the computing device 100 may provide image or video information for visually describing the operation of the target model, the information for identifying the training dataset corresponding to the target model, and the model performance information corresponding to the target model, in response to the first user input for selecting the target model on the candidate model list. The image or video information for visually describing the operation of the target model may include image or video information illustrating a result output from the target model when inputting input data into the target model.

In an exemplary embodiment, the computing device 100 may provide a candidate node list including benchmark information of each of the plurality of candidate nodes when the target model is executed on each of the plurality of candidate nodes recommended for benchmarking in response to determining the target model (430).

The candidate nodes in the present disclosure may include nodes that may support the target model. In an exemplary embodiment, the candidate nodes may include nodes that may support an execution environment or framework corresponding to the target model among nodes under the management of the computing device 100. As a non-limited example, the candidate nodes may be used as a meaning that encompasses physical hardware, virtual hardware, hardware which is impossible to be accessed through the network from the outside, hardware which is impossible to confirm externally, and/or hardware which is confirmed in a cloud. For example, the candidate node in the present disclosure may include various types of hardware such as Jetson Nano, Jetson Xavier NX, Jetson TX2, Jetson AGX Xavier, Jetson AGX Orin, GPU AWS-T4, Xcon-W-2223, Raspberry Pi Zero, Raspberry Pi 2W, Raspberry Pi 3B+, Raspberry Pi Zero 4B, and Mobile.

In an exemplary embodiment, the benchmark information may include information for identifying each of the candidate nodes and/or performance information for each of the candidate nodes when the target model is executed. An example of the performance information may include latency information. For example, the information for identifying each candidate node may include the name of the candidate node.

In an exemplary embodiment, the benchmark information may include a data structure that visually represents latency information for each candidate node and information for identifying each candidate node in a graph form when the target model is executed. For example, the graph-form data structure may have a two-dimensional form including a first axis corresponding to identification information for each candidate node and a second axis corresponding to performance information for each candidate node.

In an exemplary embodiment, the candidate node list may include a table-form data structure, for example.

In an exemplary embodiment, the benchmark information may be generated based on information obtained through an actual measurement process before the first user input. For example, before the first user input, a benchmark or performance measurement may be performed on each of the plurality of nodes and each of the plurality of models under the management of the computing device 100. The result of the benchmark or performance measurement may be pre-stored in the computing device 100 as the benchmark information. When the target model and the target node are determined according to interaction with the user, the computing device 100 may obtain benchmark information corresponding to the target model and the target node from the pre-stored benchmarks or performance measurement results. Accordingly, before executing the benchmarks for the target model and the target node in response to the first user input and the second user input, the computing device 100 may provide past measured benchmark information for the target model and the target node.

In an exemplary embodiment, the computing device 100 may determine a target node to be benchmarked based on the second user input on the candidate node list (440).

In an exemplary embodiment, the computing device 100 may deliver the candidate node list to a computing device (e.g., a user device, etc.) that requests the benchmark. A target node on which the benchmark will be performed may be determined according to the user input on the candidate node list.

In an exemplary embodiment, the computing device 100 may receive user input data for selecting a specific node from the candidate node list. The computing device 100 may determine the selected nodes included in user input data as the target node.

In an exemplary embodiment, the computing device 100 may receive user input data for selecting one target node from the candidate node list. In another exemplary embodiment, the computing device 100 may receive user input data for selecting a plurality of target nodes from the candidate node list. In another exemplary embodiment, the computing device 100 may also automatically select a node with the highest performance based on a specific factor (e.g., latency) from the candidate node list as the target node with no user input.

In an exemplary embodiment, the candidate node list may include identification information for each of the candidate nodes, and latency information for each of the candidate nodes when the target model is executed. In an exemplary embodiment, the latency information may include an anticipated inference time for each model of each node. It may be indicated that as a value of the latency information is smaller, the inference time is shorter. Accordingly, since the value of the latency may be interpreted as a performance indicator for a combination of the model and the node, the computing device 100 may provide a candidate node list sorted based on the size of the latency information. In such an example, a candidate node list including candidate nodes sorted in descending order of the size of the latency information may be provided.

In an exemplary embodiment, the identification information for the candidate node may include hardware information corresponding to the candidate node.

In an exemplary embodiment, the identification information for the candidate node may include an item name corresponding to the hardware.

In an exemplary embodiment, the identification information for the candidate node may include installed execution environment information, library information for the execution environment, power mode information, fan mode information, temperature information of a current board, and/or power usage information of the current board.

In an exemplary embodiment, the power mode information may be determined based on how many CPU cores are used. For example, when all CPU cores are used, the power mode information will be determined as MAX, and may also be determined in a scheme of quantitatively expressing usage, such as 30 W, 20 W, 15 W, and 10 W. For example, the larger the quantitative amount of the power mode information, the lower the latency may be. As another example, when the power mode is MAX, the latency may be lower than that of another node that does not use the power mode.

In an exemplary embodiment, the fan mode information may be expressed in the form of information indicating the intensity of the fan, such as Null, Quiet, and Cool. As an example, when the fan mode is Quiet, the temperature of the board may be lowered more than when the fan mode is Null, so there is a high possibility of lower latency. As an example, when the fan mode is the Cool mode, the temperature of the board may be lowered more than when another mode, so there is the high possibility of lower latency.

In an exemplary embodiment, the library information may indicate library information required to install execution environment (e.g., runtime) information installed on a specific node. Depending on the characteristics of the node, a plurality of execution environments may be included, and accordingly, the library information may also be compatible with the plurality of execution environments.

In an exemplary embodiment, the power usage of the current board may represent a power usage obtained from a power measurement sensor connected to the nodes. It may be interpreted that the smaller the power usage value of the current board, the higher the usability of the node.

In an additional exemplary embodiment, the sorting order of the candidate nodes may also be determined based on factors such as a memory usage and CPU occupancy. For example, the sorting order of the candidate nodes may be determined based additionally on the memory usage and the CPU occupancy as well as the latency information. In this example, when a difference in size of the latency information between a first candidate node and a second candidate node among the candidate nodes is within a predetermined threshold range, the sorting order between the first candidate node and the second candidate node may be determined based on the memory usage and the CPU occupancy of the first candidate node and the second candidate node. As an example, when the latencies are the same, additional sorting may be performed based on current memory (e.g., RAM) usage and CPU occupancy.

In an additional exemplary embodiment, the computing device 100 may perform sorting on the candidate node list in different schemes depending on the identification information of the node. For example, the computing device 100 may perform sorting by considering additional factors in the case of a specific node such as the Jetson series. For example, for specific types of nodes such as the Jetson series, separate sorting for the nodes may be performed additionally. As another example, the computing device 100 sorts specific types of nodes based on the latency when sorting the specific types of nodes with other types of nodes, but when nodes corresponding to the type have latency values within a similar range, perform sorting by additionally considering a Power field and/or a Fan field. As an example, the computing device 100 may perform sorting in order of a largest value of the Power field by additionally considering a factor corresponding to the Power field. As an example, when the Power field is the same or within a predetermined threshold range for the specific node such as the Jetson series, the computing device 100 may perform additional sorting for nodes in order of a larger fan's operation size based on the size or intensity of the fan's operation.

As described above, for nodes that do not have a significant difference in latency information, the sorting order of the candidate nodes may be determined by considering additional factors. In providing the candidate node list as such, the candidate nodes are sorted in a form that allows the user to intuitively check the node performance, so the user may more easily and efficiently check the performance of the nodes on the candidate node list and more efficiently determine the target node.

In an exemplary embodiment, the computing device 100 may convert the target model into a model which is supportable by the target node based on information predetermined at the target node (450).

Converting in the present disclosure may include changing a first type of model to a second type of model. Converting in the present disclosure may include changing a first operator of the model into a second operator of the model. In an exemplary embodiment, the computing device 100 may convert the target model into the model which is supportable by the target node based on the information of the determined target model and the information predetermined at the target node.

Converting in the present disclosure may include changing a first layer of the model into a second layer of the model. Specific examples related to converting will be described later in FIG. 8.

In an exemplary embodiment, the computing device 100 may provide a benchmark result obtained by executing the target model at the target node.

In an exemplary embodiment, the computing device 100 may generate a benchmark result including a result of inferring the target model at the target node.

In an exemplary embodiment, when one node is determined as the target node, benchmark request information may be transmitted to the node. In an exemplary embodiment, when a plurality of nodes is determined as the target node, the benchmark request information may be transmitted to each of the plurality of nodes. The benchmark request information may include information of the target model to be benchmarked. The information of the target model may include, for example, files or links related to the model, and/or target type information of the model.

In an exemplary embodiment, the benchmark result may be generated by the computing device 100 or generated by another server (e.g., a server including the plurality of nodes) which is under the management of the computing device 100.

In an exemplary embodiment, the benchmark result may include the performance information at the target node of the target model.

In an exemplary embodiment, the benchmark result may include time information including preprocessing time information required for preprocessing inference of the target model at the target node or inference time information required for inferring the target model at the target node. In an exemplary embodiment, the benchmark result may include memory usage information including preprocessing memory usage information required for preprocessing inference of the target model at the target node or inference memory usage information required for inferring the target model at the target node.

In an exemplary embodiment, the benchmark result may include memory footprint information required for executing the target model at the target node, latency information required for executing the target model at the target node, and power consumption information required for executing the target model at the target node.

In an exemplary embodiment, the benchmark result may vary depending on what module of another computing device which triggers or requests the benchmark operation of the computing device 100 is.

In an additional exemplary embodiment, a benchmark operation may vary depending on what module of another computing device which triggers or requests the benchmark operation of the computing device 100 is.

For example, when the module that triggers the benchmark operation of the computing device 100 is a first module, the computing device 100 may provide performance information for the entire input model, and when the module that triggers the benchmark operation of the computing device 100 is a second module, the computing device 100 may additionally provide performance information a partial model unit (e.g., a block unit which is a lower component of the model) of the input model jointly with providing the performance information for the entire input model. As another example, when module that triggers the benchmark operation of the computing device 100 is the first module, the computing device 100 may provide a benchmark result for determining a target node in which a learning model corresponding to an input dataset or a converted learning model is to be executed, and when the module that triggers the benchmark operation of the computing device 100 is the second module, the computing device 100 may provide a benchmark result including compression setting data used for generating the lightweight model corresponding to the input model.

In an exemplary embodiment, the benchmark result may include a first type of quantitative information related to time and a second type of quantitative information related to memory use.

In an exemplary embodiment, the benchmark result may include preprocessing time information required for preprocessing inference of the target model in at least one target node, inference time information required for inferring the target model in at least one target node, preprocessing memory usage information used for preprocessing the inference of the target model in at least one target node, inference memory usage information used for inferring the target model in at least one target node, quantitative information related to an inference time, which is obtained as the target model is repeatedly inferred at a predetermined number of times in at least one target node, and/or quantitative information related to memory use for each of the NPU, the CPU, and the GPU, which is obtained as the target model is inferred in at least one target node.

In an exemplary embodiment, the preprocessing time information may include time information required for preprocessing before the inference operation is performed such as calling the model. Additionally, the preprocessing time information may also include quantitative information (e.g., a minimum value, a maximum value, and/or an average value of a time required for pre-inference) related to a time required for the pre-inference when the pre-inference is repeated at a predetermined number of times for activation of the GPU, etc., before measuring a value for inference.

In an exemplary embodiment, the inference time information as time information required for during an inference process may be used to encompass minimum time information, maximum time information, average time information, and/or median time information among the inference time information, and/or time information required for an initial inference operation for the model when the model is inferred repeatedly at the predetermined number of times, for example. Additionally, for example, in a situation in which the CPU receives and processes an operation which may not be processed by the NPU, the NPU becomes an idle state, and the inference time information may include a first cycle value when the NPU becomes the idle state. Additionally, the inference time information may also include a second cycle value when the NPU performs inference and/or a third cycle value obtained by aggregating the first cycle value and the second cycle value.

In an exemplary embodiment, benchmark result information may also include total time information obtained by aggregating the preprocessing memory usage information and the quantitative information related to the inference time.

In an exemplary embodiment, the benchmark result information may additionally include a RAM usage, a ROM usage, a total memory usage, and/or a quantitative value for an SRAM area used by the NPU.

In an exemplary embodiment, when a plurality of benchmark results are generated as a plurality of node are selected as target nodes, the computing device 100 may sort the plurality of benchmark results based on latency. For example, the benchmark results may be sorted and output in an order of a smallest latency. In an additional exemplary embodiment, when there are benchmark results corresponding to a plurality of nodes in which the latency is within or is the same as a predetermined similar range, the benchmark results may be sorted additionally based on a memory usage and/or a CPU occupancy. The sort for the benchmark results may include a feature related to sorted on the candidate node list.

In an exemplary embodiment, the operation of the benchmark may be performed based on an input related to benchmark setting, for example. For example, the input related to the benchmark setting may include information to be included in the benchmark result, batch size in the inference process, identification information of the target model, software version information of the target model, hardware identification information of the target node, an output data type of the target model (e.g., FP32, FP16, INT8, INT4, etc.), target latency for the model in the learning process, an image size of the model in the learning process, and/or learning epoch.

In an exemplary embodiment, the benchmark result may include, for example, a table-form data structure.

FIG. 5 exemplarily illustrates a candidate model list 500 according to an exemplary embodiment of the present disclosure.

In an exemplary embodiment, the candidate model list 500 may include a first model 540, a second model 550, a third model 560, a fourth model 570, and a fifth model 580.

In an exemplary embodiment, the models 540, 550, 560, 570, and 580 included in the candidate model list 500 may include tasks 510a, 510b, 510c, 510d, and 510e of the model, objects 520a, 520b, 520c, 520d, and 520e of the model, and/or representative images 530a, 530b, 530c, 530d and 530e of the model.

In an exemplary embodiment, the first model 540 may have a task 510a of the model related to object detection. The object 520a of the first model 540 may correspond to a vehicle. As shown in the representative image 530a of the first model 540, it may be intuitively confirmed through the representative image 530a that the first model 540 is a model that detects an object called the vehicle in the image.

In an exemplary embodiment, the second model 550 may have a task 510b of the model related to object detection. The object 520b of the second model 550 may correspond to a person. As shown in the representative image 530b of the second model 550, it may be intuitively confirmed through the representative image 530b that the second model 550 is a model that detects an object called the person in the image.

In an exemplary embodiment, the third model 560 may have a task 510c of the model related to object detection. The object 520c of the third model 560 may correspond to a hand. As shown in the representative image 530c of the third model 560, it may be intuitively confirmed through the representative image 530c that the third model 560 is a model that detects an object called the hand in the image.

In an exemplary embodiment, the fourth model 570 may have a task 510d of the model related to object detection. The object 520d of the fourth model 570 may correspond to a porthole. As shown in the representative image 530d of the fourth model 570, it may be intuitively confirmed through the representative image 530d that the fourth model 570 is a model that detects an object called the porthole in the image.

In an exemplary embodiment, the fifth model 580 may have a task 510e of the model related to semantic segmentation. The object 520e of the fifth model 580 may correspond to MOD. As shown in the representative image 530e of the fifth model 580, it may be intuitively confirmed through the representative image 530e that the fifth model 580 is a model that segmentation performs related to the MOD in the image.

In an exemplary embodiment, each of the candidate models included in the candidate model list may be specified and classified as a task-object. For example, each of the candidate models included in the candidate model list may be displayed separately from other candidate models as a unit based on a combination of a task and an object. In such an example, a first candidate model corresponding to a first task and a first object may be distinguished from a second model corresponding to a first task and a second object and a third model corresponding to a second task and a first object. Therefore, the user may easily determine a model to be intended to be obtained based on the task and object of the artificial intelligence model on the candidate model list.

In an exemplary embodiment, the computing device 100 divides models into task and object units and displays the candidate model list, so an artificial intelligence-based model which the user wants to create may be provided more efficiently and intuitively. Accordingly, the user may obtain an artificial intelligence-based model corresponding to a desired task and a desired object even with a low understanding of the artificial intelligence model and without learning the artificial intelligence model.

FIG. 6 exemplarily illustrates information 600 on a target model provided according to an exemplary embodiment of the present disclosure.

In an exemplary embodiment, the information 600 on the target model illustrated in FIG. 6 may be displayed in response to the target model being selected on the candidate model list in FIG. 5.

The example in FIG. 6 is an example of a case where the second model 550 in FIG. 5 is selected as the target model.

In an exemplary embodiment, the information 600 on the target model may include first information 610 that displays or exemplifies the operation of the target model in the form of a text, second information 620 that displays or exemplifies the operation of the target model in the form of a video or image, third information 630 that identifies a dataset used in the target model, and/or fourth information 640 that displays the performance of the target model.

Since detailed information of the target model is displayed in response to selecting the target model, the technique according to an exemplary embodiment of the present disclosure may allow the user to more specifically determine whether the selected target model is suitable.

In additional exemplary embodiment of the present disclosure, at least one of the first information 610, the second information 620, the third information 630, the fourth information 640, or the fifth information 640 may be activated to receive a selection input from the user. For example, when a user input on a location corresponding to the first information 610 is received, a text for describing the operation of the model as other contents may be output or a user interface which may select another model having corresponding contents may be provided. For example, when a user input on a location corresponding to the second information 620 is received, a video which outputs the operation of the model may be played or a user interface which may select another model having corresponding video contents may be provided. For example, when a user input is received on a location corresponding to the third information 630, detailed information of the dataset (type of correct answer data in the learning data, source of the learning data, and/or a validation scheme for the learning data) may be output or a user interface which allows the dataset to be changed may be provided. For example, when a user input is received at a location corresponding to the fourth information 640, different types of performance information may be output, detailed information of the performance information may be output, or a user interface in which a model with better performance information is recommended, or a smaller or larger model is recommended may be provided.

FIG. 7 exemplarily illustrates a candidate node list 700 according to an exemplary embodiment of the present disclosure.

As illustrated in FIG. 7, the candidate node list 700 may include a plurality of nodes 710 and performance information 720 for each of the plurality of nodes 710.

In an exemplary embodiment, the candidate node list 700 may correspond to benchmark information. The performance information 720 may include latency information. The benchmark information may include information 710 for identifying each of candidate nodes and latency information 720 for each of the candidate nodes when the target model is executed.

In an exemplary embodiment, as illustrated in FIG. 7, the candidate node list 700 or the benchmark information may include a data structure that visually represents latency information 720 for each candidate node 710 when the target model is executed and information for identifying each of the candidate nodes 710 in a graph form. FIG. 7 illustrates the latency information 720 and the candidate nodes 710 in the graph form for convenience of description, but any form of data structure which enables visual comparison of 2D or more, such as a table form and/or a matrix form may also be included in the scope of the present disclosure according to an implementation aspect.

In an exemplary embodiment, the candidate nodes 710 may include nodes that may support the target model (e.g., that may support the framework of the target model). As an example, the candidate nodes 710 may be linked to the determined target model. In such an example, the candidate nodes 710 being linked to the target model may mean that the candidate nodes 710 on the candidate node list may vary depending on the determined target model.

In an exemplary embodiment, the candidate nodes 710 may be constituted by predetermined nodes regardless of whether the target model is supported. In this case, when a candidate node that does not support the framework of the target model is selected as the target node, the computing device 100 may convert the target model into a form supportable by the target node through a converting operation.

In an exemplary embodiment, the latency information 720 is information obtained by previously performing a benchmark on each of the candidate nodes 710. Since pre-measured latency information 720 is provided for each of the candidate nodes 710, a technical effect of being able to more intuitively and efficiently determine the target node on which to execute the target model is to be achieved. In an exemplary embodiment, since the latency information 720 may be generated based on information obtained through an actual measurement process before the user input for benchmarking, information having a high correspondence to the benchmark result may be provided to the user before actually performing the benchmark.

FIG. 8 exemplarily illustrates a method for providing a converted target model according to an exemplary embodiment of the present disclosure.

In an exemplary embodiment, the computing device 100 may convert the target model so that the target model may be executed on the target node when the target model is determined (810) and the target node is determined (820). The computing device 100 may convert the target model into a model which is supportable by the target node based on the information predetermined at the target node. For example, when the framework of the target model corresponds to Onnx Runtime and the target node does not support Onnx Runtime, the computing device 100 may convert the target model to a framework (e.g., TensorRT) supported by the target node. As a result of such converting, the converted target model may be generated.

In an exemplary embodiment, the converted target model may be automatically generated in response to the user input of selecting the target node on the candidate node list. In an exemplary embodiment, when the target model and the target node are determined (810 and 820), the converted target model may be automatically generated.

In an exemplary embodiment, the computing device 100 may determine a target framework in which the target model is to be converted based on the target node, and display software version information and an output data type corresponding to the target framework. The computing device 100 may convert the target model to correspond to the target framework which is supportable by the target node in response to a user input for converting the target model.

In an exemplary embodiment, a user interface related to converting setting 830 may be provided in a process of the converting operation. Information related to converting may be provided through a user interface related to the converting setting 830, and/or an additional input of the user related to the converting may be received. The user interface related to the converting setting 830 may include information for identifying a target framework which is to be converted, software version information corresponding to the target framework, information of the output data type of the converted target model, information related to the target node, information of input data of the converted target model, and/or information related to a file name of the converted target model.

In an exemplary embodiment, the converting setting 830 may include notifying that the target model is to be converted into a specific type of model, inducing selection of a specific model among the models to be converted, providing performance information of each of the models to be converted, or requesting an input for confirming that converting is to be performed from the user.

In an exemplary embodiment, the computing device 100 may automatically perform the converting operation without receiving the user input when the target model and the target node are determined (810 and 820). For example, the models included in the candidate model list are models generated as a type that is not supported by the candidate nodes managed by the computing device 100, and as a result, the computing device 100 may perform converting for the target model to be suitable for the candidate node when the candidate node is determined on the candidate node list.

In an exemplary embodiment, the target model 840 converted by the converting operation may be generated. For example, the computing device 100 may perform converting by changing an operator not supported by the target node among operators included in the target model to an operator supported by the target model. For example, the computing device 100 may convert the target model into an execution environment or framework supported by the target node.

In an exemplary embodiment, the computing device 100 may perform converting using converting identification information indicating a combination between the type of model to be converted and the type of model after converting. Such converting may be performed by an external device (e.g., a converting device).

In an exemplary embodiment, the computing device 100 may determine a converter corresponding to the converting identification information among a plurality of converters and perform converting for the model using the determined converter.

In an exemplary embodiment, a user interface may be provided that allows downloading the converted target model (850). The converted target model may be provided in a downloadable form in response to the user input. The downloading of the converted target model (850) may be performed independently of benchmark of the converted target model (860).

In an exemplary embodiment, the benchmark of the converted target model (860) may be performed. The benchmark of the converted target model (860) may be performed by the target node.

FIG. 9 exemplarily illustrates information 900 on converting provided according to an exemplary embodiment of the present disclosure.

The information 900 on the converting illustrated in FIG. 9 may include information 930 for identifying a target framework which is to be converted, software version information 950 corresponding to the target framework, information 960 on the output data type of the converted target model, information 940 related to the target node, information 920 on input data of the converted target model, and/or information 910 related to a file name of the converted target model.

In an exemplary embodiment, when a user input is applied to a location corresponding to the information 910 related to the file name of the converted target model, a user interface for changing the file name may be generated.

In an exemplary embodiment, the information 920 on the input data of the converted target model may include a batch size, the number of channels, and/or the size of the input data. For example, when a user input is applied to a location corresponding to the information 920 on the input data of the converted target model, a user interface for modifying the input data related to the target model may be provided.

In an exemplary embodiment, when a user input is applied to a location corresponding to the information 930 for identifying the target framework to be converted, a user interface for changing the converted target framework may be provided.

In an exemplary embodiment, when a user input is applied to a location corresponding to the information 940 related to the target node, a user interface for changing the target node may be provided.

In an exemplary embodiment, when a user input is applied to a location corresponding to the software version information 950 corresponding to the target framework, a user interface for changing the software version information may be provided.

In an exemplary embodiment, when a user input is applied to a location corresponding to the information 960 of the output data type of the converted target model, a user interface for changing the output data type may be provided.

In an exemplary embodiment, each information included in the information 900 on the converting may be displayed in a predetermined form as a default value with no user input.

In an exemplary embodiment, the information 900 on the converting include notifying that the target model is to be converted into a specific type of model, inducing selection of a specific model among the models to be converted, providing performance information of each of the models to be converted, or requesting an input for confirming that converting is to be performed from the user.

FIG. 10 is a schematic view of a computing environment of the computing device 100 according to an exemplary embodiment of the present disclosure.

In the present disclosure, the component, the module, or the unit includes a routine, a procedure, a program, a component, and a data structure that perform a specific task or implement a specific abstract data type. Further, it will be well appreciated by those skilled in the art that the methods presented by the present disclosure can be implemented by other computer system configurations including a personal computer, a handheld computing device, microprocessor-based or programmable home appliances, and others (the respective devices may operate in connection with one or more associated devices) as well as a single-processor or multi-processor computing device, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computing device generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media.

The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable instruction, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 2000 that implements various aspects of the present disclosure including a computer 2002 is shown and the computer 2002 includes a processing device 2004, a system memory 2006, and a system bus 2008. The computer 200 in the present disclosure may be used intercompatibly with the computer device 100. The system bus 2008 connects system components including the system memory 2006 (not limited thereto) to the processing device 2004. The processing device 2004 may be a predetermined processor among various commercial processors. A dual processor and other multi-processor architectures may also be used as the processing device 2004.

The system bus 2008 may be any one of several types of bus structures which may be additionally interconnected to a local bus using any one of a memory bus, a peripheral device bus, and various commercial bus architectures. The system memory 2006 includes a read only memory (ROM) 2010 and a random access memory (RAM) 2012. A basic input/output system (BIOS) is stored in the non-volatile memories 2010 including the ROM, the EPROM, the EEPROM, and the like and the BIOS includes a basic routine that assists in transmitting information among components in the computer 2002 at a time such as in-starting. The RAM 2012 may also include a high-speed RAM including a static RAM for caching data, and the like.

The computer 2002 also includes an internal hard disk drive (HDD) 2014 (for example, EIDE and SATA), a magnetic floppy disk drive (FDD) 2016 (for example, for reading from or writing in a mobile diskette 2018), SSD and an optical disk drive 2020 (for example, for reading a CD-ROM disk 2022 or reading from or writing in other high-capacity optical media such as the DVD). The hard disk drive 2014, the magnetic disk drive 2016, and the optical disk drive 2020 may be connected to the system bus 2008 by a hard disk drive interface 2024, a magnetic disk drive interface 2026, and an optical drive interface 2028, respectively. An interface 2024 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 2002, the drives and the media correspond to storing of predetermined data in an appropriate digital format. In the description of the computer readable storage media, the mobile optical media such as the HDD, the mobile magnetic disk, and the CD or the DVD are mentioned, but it will be well appreciated by those skilled in the art that other types of storage media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 2030, one or more application programs 2032, other program module 2034, and program data 2036 may be stored in the drive and the RAM 2012. All or some of the operating system, the application, the module, and/or the data may also be cached in the RAM 2012. It will be well appreciated that the present disclosure may be implemented in operating systems which are commercially usable or a combination of the operating systems.

A user may input instructions and information in the computer 2002 through one or more wired/wireless input devices, for example, pointing devices such as a keyboard 2038 and a mouse 2040. Other input devices (not illustrated) may include a microphone, an IR remote controller, a joystick, a game pad, a stylus pen, a touch screen, and others. These and other input devices are often connected to the processing device 2004 through an input device interface 2042 connected to the system bus 2008, but may be connected by other interfaces including a parallel port, an IEEE 1394 serial port, a game port, a USB port, an IR interface, and others.

A monitor 2044 or other types of display devices are also connected to the system bus 2008 through interfaces such as a video adapter 2046, and the like. In addition to the monitor 2044, the computer generally includes a speaker, a printer, and other peripheral output devices (not illustrated).

The computer 2002 may operate in a networked environment by using a logical connection to one or more remote computers including remote computer(s) 2048 through wired and/or wireless communication. The remote computer(s) 2048 may be a workstation, a server computer, a router, a personal computer, a portable computer, a microprocessor-based entertainment apparatus, a peer device, or other general network nodes and generally includes multiple components or all of the components described with respect to the computer 2002, but only a memory storage device 2050 is illustrated for brief description. The illustrated logical connection includes a wired/wireless connection to a local area network (LAN) 2052 and/or a larger network, for example, a wide area network (WAN) 2054. The LAN and WAN networking environments are general environments in offices and companies and facilitate an enterprise-wide computer network such as Intranet, and all of them may be connected to a worldwide computer network, for example, the Internet.

When the computer 2002 is used in the LAN networking environment, the computer 2002 is connected to a local network 2052 through a wired and/or wireless communication network interface or an adapter 2056. The adapter 2056 may facilitate the wired or wireless communication to the LAN 2052 and the LAN 2052 also includes a wireless access point installed therein in order to communicate with the wireless adapter 2056. When the computer 2002 is used in the WAN networking environment, the computer 2002 may include a modem 2058, is connected to a communication server on the WAN 2054, or has other means that configure communication through the WAN 2054 such as the Internet, etc. The modem 2058 which may be an internal or external and wired or wireless device is connected to the system bus 2008 through the serial port interface 2042. In the networked environment, the program modules described with respect to the computer 2002 or some thereof may be stored in the remote memory/storage device 2050. It will be well known that an illustrated network connection is exemplary and other means configuring a communication link among computers may be used.

The computer 2002 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Method claims provide elements of various steps in a sample order, but the method claims are not limited to the presented specific order or hierarchical structure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for providing a user interface for converting a target model to fit a target node, performed by a computing device, comprising:
   displaying, via the user interface, a candidate model list comprising a plurality of candidate models which are artificial intelligence-based models, wherein each of the plurality of candidate models within the candidate model list is distinguished from other candidate models within the candidate model list by a unit of a combination of task identification information to identify an artificial intelligence task for each of the plurality of candidate models and object identification information to identify an object outputted from each of the plurality of candidate models, and the candidate model list indicates each of the plurality of candidate models along with a representative image which visually represents a combination of the artificial intelligence task and the outputted object for each of the candidate models;
   determining the target model to be converted or benchmarked, based on a first user input selecting the target model on the candidate model list;
   automatically displaying, via the user interface, a candidate node list comprising a plurality of candidate nodes in response to determining the target model, wherein the candidate node list indicates each of the plurality of candidate nodes along with a representation of expected performance of each of the candidate nodes for the target model when the target model is executed on each candidate node, and wherein the candidate nodes in the candidate node list vary depending on the determined target model;
   determining the target node to be converted or benchmarked, based on a second user input selecting the target node on the candidate node list;
   displaying, via the user interface, information for identifying a target framework supportable by the target node in response to determining the target node, wherein when a user input is applied to a location corresponding to the information for identifying the target framework, a user interface for changing the target framework is generated;
   converting the target model into a model supportable by the target node, by automatically changing a layer unsupportable by the target node among layers constituting the target model into a layer supportable by the target node based on information of the determined target model and information preset on the target node; and providing, to the target node, the converted target model supportable by the target node, wherein the determining the target model to be converted or benchmarked based on the first user input on the candidate model list comprises automatically providing model performance corresponding to the target model and information to identify a training dataset corresponding to the target model, in response to the first user input selecting the target model on the candidate model list.

2. The method of claim 1, wherein the representative image comprises a first sub-image representation for visually indicating the artificial intelligence task and a second sub-image representation for visually indicating the outputted object.

3. The method of claim 1, wherein the candidate model list further comprises class information to identify each of classes used in each of the plurality of candidate models.

4. The method of claim 1, wherein the converting the target model comprises:
determining the target framework supportable by the target node and a source framework of the target model in response to the second user input selecting the target node on the candidate node list; and
automatically converting the target model to correspond to the target framework supportable by the target node without a user input when it is determined that the source framework and the target framework are different.

5. The method of claim 1, wherein the converting the target model comprises:
determining the target framework to which the target model is converted based on the target node and indicating an output data type and software version information corresponding to the target framework; and
converting the target model to correspond to the target framework supportable by the target node in response to a third user input to convert the target model.

6. The method of claim 1, wherein the converting the target model comprises:
determining the target framework to which the target model is converted based on the target node and indicating an input size, channel information and batch size corresponding to the target framework; and
converting the target model to correspond to the target framework supportable by the target node in response to a third user input to convert the target model.

7. The method of claim 1, wherein the converting the target model comprises:
determining a source framework of the target model and the target framework supportable by the target node;
determining converting identification information representing a combination of the source framework and the target framework when it is determined that the source framework and the target framework are different; and
converting the target model into the model supportable by the target node by determining a converter corresponding to the converting identification information among a plurality of converters and using the determined converter.

8. The method of claim 1, wherein the determining the target model to be converted or benchmarked based on the first user input on the candidate model list comprises further providing video information to visually describe an operation of the target model, in response to the first user input selecting the target model on the candidate model list.

9. The method of claim 1, wherein the model performance information comprises:
size information of the target model;
accuracy information indicating a ratio of actual correct answers among results output by the target model as correct; and
class information to identify each of classes used in the target model.

10. The method of claim 1, wherein the candidate node list comprises:
information to identify each of the candidate nodes; and
benchmark prediction information of the target model at each of the candidate nodes when the target model is executed.

11. The method of claim 10, wherein the benchmark prediction information is a data structure visually representing, in graph form, information for identifying each of the candidate nodes and latency information for each of the candidate nodes when the target model is executed.

12. The method of claim 10, wherein the benchmark prediction information is generated based on information obtained through performance measurement process for a model or a converted model at each of the candidate nodes prior to the first user input.

13. The method of claim 1, further comprising:
providing a benchmark result obtained by executing the converted target model at the target node, and
wherein the benchmark result comprises:
time information comprising preprocessing time information required for preprocessing of inference of the target model at the target node, or inference time information required for inference of the target model at the target node; and
memory usage information comprising preprocessing memory usage information required for preprocessing of inference of the target model at the target node, or inference memory usage information required for inference of the target model at the target node.

14. The method of claim 1, further comprising:
providing a benchmark result obtained by executing the converted target model at the target node, and
wherein the benchmark result comprises:
memory footprint information required for executing the target model on the target node;
latency information required for executing the target model on the target node; and
power usage information required for executing the target model on the target node.

15. The method of claim 1, wherein the candidate node list comprises the candidate nodes which do not support the candidate models included in the candidate model list.

16. The method of claim 1, wherein the representative image includes a segmented image produced by the candidate model.

17. A computer program stored in a non-transitory computer readable medium, wherein the computer program allows a computing device to perform following operations to provide a user interface for converting a target model to fit a target node when executed by the computing device, and wherein the operations comprise:
displaying, via the user interface a candidate model list comprising a plurality of candidate models which are artificial intelligence-based models, wherein each of the plurality of candidate models within the candidate model list is distinguished from other candidate models within the candidate model list by a unit of a combination of task identification information to identify an artificial intelligence task for each of the plurality of candidate models and object identification information to identify an object outputted from each of the plurality of candidate models, and the candidate model list indicates each of the plurality of candidate models along with a representative image which visually represents a combination of the artificial intelligence task and the outputted object performed for each of the candidate models;

determining the target model to be converted or benchmarked, based on a first user input selecting the target model on the candidate model list;

automatically displaying, via the user interface, a candidate node list comprising a plurality of candidate nodes in response to determining the target model, wherein the candidate node list indicates each of the plurality of candidate nodes along with a representation of expected performance of each of the candidate nodes for the target model when the target model is executed on each candidate node, and wherein the candidate nodes in the candidate node list vary depending on the determined target model;

determining the target node to be converted or benchmarked, based on a second user input selecting the target node on the candidate node list;

displaying, via the user interface, information for identifying a target framework supportable by the target node in response to determining the target node, wherein when a user input is applied to a location corresponding to the information for identifying the target framework, a user interface for changing the target framework is generated;

converting the target model into a model supportable by the target node, by automatically changing a layer unsupportable by the target node among layers constituting the target model into a layer supportable by the target node, based on information of the determined target model and information preset on the target node; and providing, to the target node, the converted target model supportable by the target node, wherein the determining the target model to be converted or benchmarked based on the first user input on the candidate model list comprises automatically providing model performance corresponding to the target model and information to identify a training dataset corresponding to the target model, in response to the first user input selecting the target model on the candidate model list.

18. A computing device for providing a user interface for converting a target model to fit a target node, comprising:
at least one processor; and
a memory,
wherein the at least one processor:

displays, via the user interface, a candidate model list comprising a plurality of candidate models which are artificial intelligence-based models, wherein each of the plurality of candidate models within the candidate model list is distinguished from other candidate models within the candidate model list by a unit of a combination of task identification information to identify an artificial intelligence task for each of the plurality of candidate models and object identification information to identify an object outputted from each of the plurality of candidate models, and the candidate model list indicates each of the plurality of candidate models along with a representative image which visually represents a combination of the artificial intelligence task and the outputted object performed for each of the candidate models;

determines the target model to be converted or benchmarked, based on a first user input selecting the target model on the candidate model list;

automatically displays, via the user interface, a candidate node list comprising a plurality of candidate nodes in response to determining the target model, wherein the candidate node list indicates each of the plurality of candidate nodes along with a representation of expected performance of each of the candidate nodes for the target model when the target model is executed on each candidate node, and wherein the candidate nodes in the candidate node list vary depending on the determined target model;

determines the target node to be converted or benchmarked, based on a second user input selecting the target node on the candidate node list;

displays, via the user interface, information for identifying a target framework supportable by the target node in response to determining the target node, wherein when a user input is applied to a location corresponding to the information for identifying the target framework, a user interface for changing the target framework is generated;

converts the target model into a model supportable by the target node, by automatically changing a layer unsupportable by the target node among layers constituting the target model into a layer supportable by the target node, based on information of the determined target model and information preset on the target node; and provides, to the target node, the converted target model supportable by the target node, wherein the determining the target model to be converted or benchmarked based on the first user input on the candidate model list comprises automatically providing model performance corresponding to the target model and information to identify a training dataset corresponding to the target model, in response to the first user input selecting the target model on the candidate model list.

* * * * *